United States Patent
Loferer et al.

(10) Patent No.: US 7,113,878 B1
(45) Date of Patent: Sep. 26, 2006

(54) TARGET FOR CALIBRATING A NON-CONTACT SENSOR

(75) Inventors: Hannes Loferer, Ann Arbor, MI (US); Dale Greer, Novi, MI (US)

(73) Assignee: Perceptron, Inc., Plymouth, MI (US)

( * ) Notice: Subject to any disclaimer, the term of this patent is extended or adjusted under 35 U.S.C. 154(b) by 0 days.

(21) Appl. No.: 11/131,610

(22) Filed: May 18, 2005

(51) Int. Cl.
G01C 25/00 (2006.01)
G01D 18/00 (2006.01)

(52) U.S. Cl. .......................... 702/104; 702/85
(58) Field of Classification Search .................. 702/85, 702/93, 94, 95, 97, 104, 150, 152, 167; 356/243.1, 356/601, 608
See application file for complete search history.

(56) References Cited

U.S. PATENT DOCUMENTS

| | | | |
|---|---|---|---|
| 4,645,348 A | 2/1987 | Dewar et al. | |
| 4,841,460 A | 6/1989 | Dewar et al. | |
| 4,964,722 A | 10/1990 | Schumacher | |
| 5,090,803 A | 2/1992 | Ames et al. | |
| 5,295,073 A | 3/1994 | Celette | |
| 5,329,469 A | 7/1994 | Watanabe | |
| 5,388,059 A | 2/1995 | De Menthon | |
| 5,532,816 A | 7/1996 | Spann et al. | |
| 5,552,883 A * | 9/1996 | Busch-Vishniac et al. | 356/139.03 |
| 5,570,190 A | 10/1996 | Terawahi et al. | |
| 5,661,667 A | 8/1997 | Rueb et al. | |
| 5,724,743 A | 3/1998 | Jackson | |
| 5,757,499 A | 5/1998 | Eaton | |
| 5,784,282 A | 7/1998 | Abitbol et al. | |
| 5,801,834 A | 9/1998 | Danielson et al. | |
| 6,285,959 B1 | 9/2001 | Greer | |
| 6,822,748 B1 * | 11/2004 | Johnston et al. | 356/608 |

* cited by examiner

Primary Examiner—Bryan Bui
(74) Attorney, Agent, or Firm—Harness, Dickey & Pierce, P.L.C.

(57) ABSTRACT

An improved target assembly is provided for use in calibrating a non-contact sensor in a sensor calibration system. The target assembly includes: a plate member; three pairs of truncated cones mounted adjacent to each other on a surface of the plate member, where one of the truncated cones in each pair is orientated inversely in relation to the other truncated cone; and at least three targets connected to the plate member for calibrating the target assembly in relation to a reference frame external to the target assembly.

20 Claims, 7 Drawing Sheets

TARGET FOR CALIBRATING A NON-CONTACT SENSOR

FIELD OF THE INVENTION

The present invention relates to non-contact gauging applications and, more particularly, to an improved target for calibrating a non-contact sensor in a sensor calibration system.

BACKGROUND OF THE INVENTION

Demand for higher quality has pressed manufacturers of mass produced articles, such as automotive vehicles, to employ automated manufacturing techniques that were unheard of when assembly line manufacturing was first conceived. Today, robotic equipment is used to assemble, weld, finish, gauge and test manufactured articles with a much higher degree of quality and precision than has been heretofore possible. Computer-aided manufacturing techniques allow designers to graphically conceptualize and design a new product on a computer workstation and the automated manufacturing process ensures that the design is faithfully carried out precisely according to specification. Machine vision is a key part of today's manufacturing environment. Machine vision systems are used in conjunction with computer-aided design systems and robotics to ensure high quality is achieved at the lowest practical cost.

Achieving high quality manufactured parts requires highly accurate, tightly calibrated machine vision sensors. Not only must a sensor have a suitable resolution to discern a manufactured feature of interest, the sensor must be accurately calibrated to a known frame of reference so that the feature of interest may be related to other features on the workpiece. Without accurate calibration, even the most sensitive, high resolution sensor will fail to produce high quality results.

In a typical manufacturing environment, there may be a plurality of different non-contact sensors, such as optical sensors, positioned at various predetermined locations within the manufacturing, gauging or testing station. The workpiece is placed at a predetermined, fixed location within the station, allowing various predetermined features of the workpiece to be examined by the sensors. Preferably, all of the sensors properly positioned and should be carefully calibrated with respect to some common fixed frame of reference, such as a common reference frame on the workpiece or at the workstation.

It is also envisioned that the non-contact sensors and their associated mounting structures may get bumped or jarred, thereby throwing the sensor out of alignment. From time to time, a sensor also needs to be replaced, almost certainly requiring reorienting and recalibrating. Thus, sensor positioning, alignment and calibration is a fact of life in the typical manufacturing environment.

Therefore, it is desirable to provide a quick and efficient technique for calibrating such non-contact sensors.

SUMMARY OF THE INVENTION

An improved target assembly is provided for use in calibrating a non-contact sensor in a sensor calibration system. The target assembly includes: a plate member; three pairs of truncated cones mounted adjacent to each other on a surface of the plate member, where one of the truncated cones in each pair is orientated inversely in relation to the other truncated cone; and at least three targets connected to the plate member for calibrating the target assembly in relation to a reference frame external to the target assembly.

In an exemplary embodiment, a laser tracker is used to calibrate the target assembly to an external reference frame. Thus, the three additional targets are further defined as nesting stations configured to support a retroreflector associated with the laser tracker.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
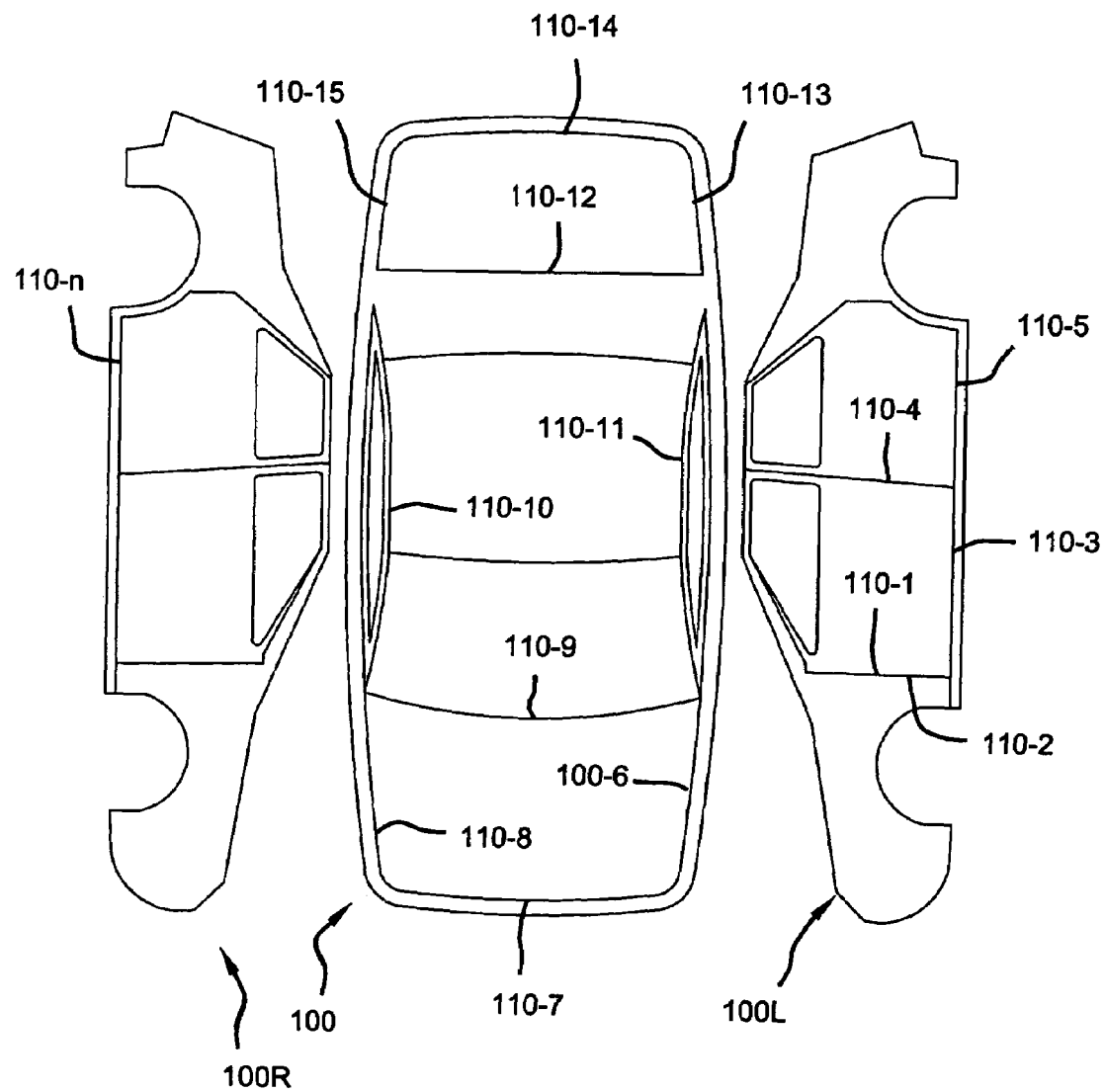
FIG. 1 is a simultaneous top and side view of a portion of an automotive vehicle body, showing typical points of interest which would be placed in the field of view of one or more non-contact sensors at a gauging station.

With reference to FIG. 1, there is shown a typical automotive vehicle body portion 100 which, prior to its assembly with other of the vehicle components, would require gauging of certain key points. For convenience, the left side 100L of the vehicle body and the right side 100R of the vehicle body are shown in an "unfolded" view. Exemplary points of interest on workpiece 100 are shown as points 110-1 through 110-n. Typical usages for the points or the manner in which they are selected would be dictated, for example, by the ensuing assembly process to take place with respect to the workpiece 100. For example, assume that the hood has not yet been assembled over the hood cavity at the front of the vehicle. Then measurements about the periphery of the hood cavity, such as at points 110-6, 110-7, 110-8 and 110-9 could be made to determine whether the ensuing assembly of the hood lid to the vehicle body can be performed with an acceptable fit between the parts to be assembled.

Figure 2:
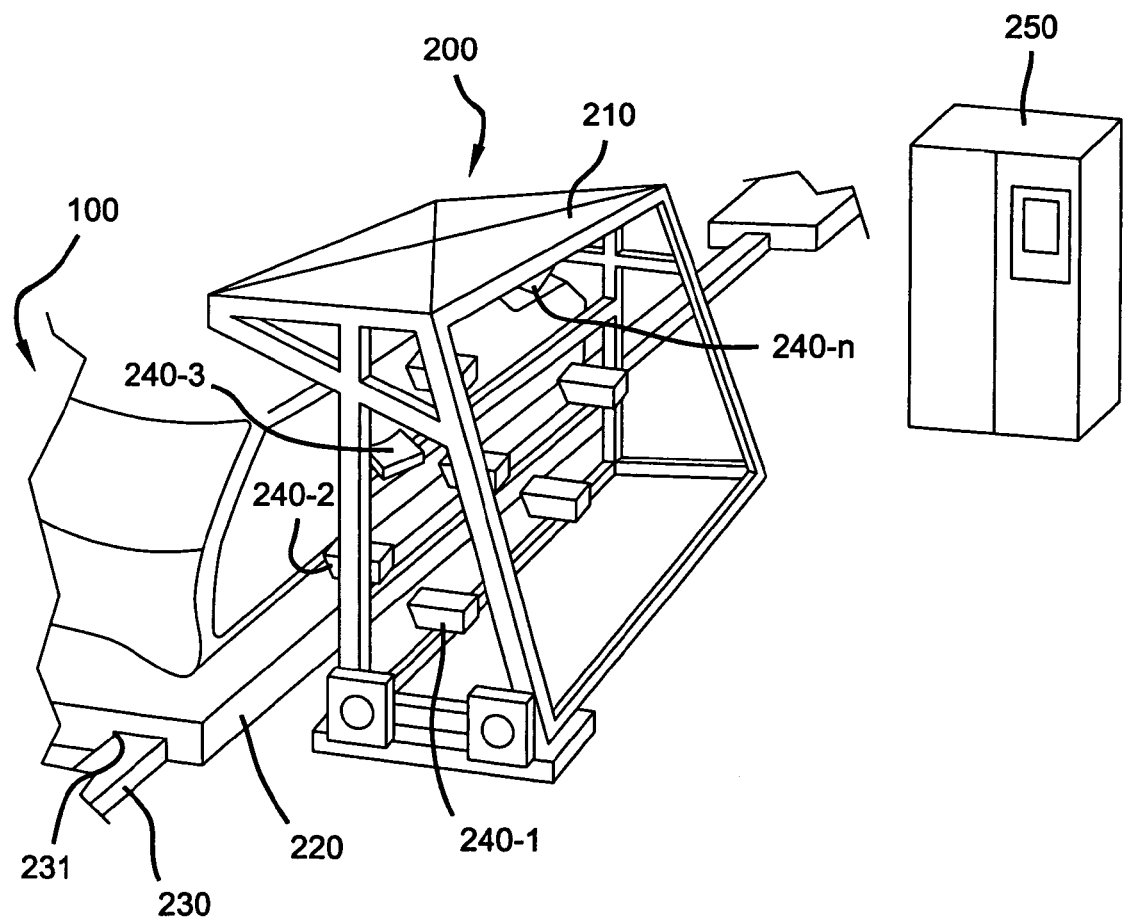
FIG. 2 is a perspective view of a typical gauging station on an automotive assembly line.

A typical gauging station 200 for an automotive vehicle part could take the form shown in FIG. 2. Workpieces to be gauged at the gauging station 200 rest on transporting pallets 220, which are moved along an assembly line via pallet guides 230 that pass through guide channels 231 in the pallet. At the gauging station 200, a sensor mounting frame 210 (only one half of which is shown in FIG. 2) surrounds the workpiece 100 to be gauged and provides a plurality of mounting positions for a series of non-contact sensors 240-1 through 240-n.

Each sensor is configured to project one or more planes of laser light towards the workpiece and capture image data which correlates to an intersection between the structured light and the surface of the workpiece. Image data may be translated to measurement data at the sensor or at a remote computer 250. In either case, data is sent from the sensor to the remote computer 250 for further processing and/or storage. This type of sensor is commonly referred to as a laser triangulation sensor. For further details regarding an exemplary sensor, reference may be had to the TriCam sensors manufactured by Perceptron Inc. of Plymouth, Mich. However, it is readily understood that other types of non-contact sensors are also with in the scope of the present invention.

Figure 3:
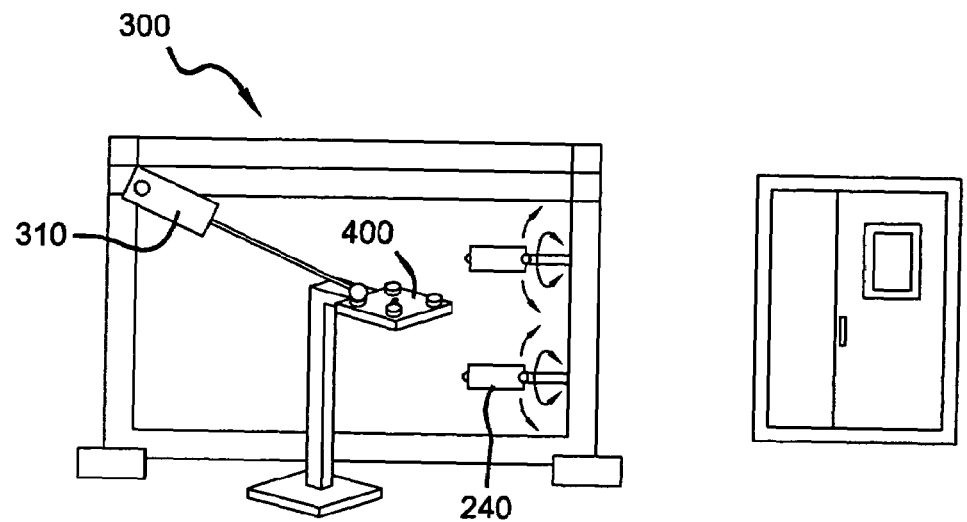
FIG. 3 is a side elevational view of a sensor calibration system integrated with an exemplary gauging station in accordance with the present invention.

Referring to FIG. 3, a gauging station is shown in conjunction with a sensor calibration system 300 accordingly to the principles of the present invention. To simplify the illustration, only two non-contact sensors 240 have been illustrated. Each non-contact sensor 240 is adjustably secured to the gauging station frame, allowing the sensor to be positionally adjusted and then tightened or locked into place once it is properly aimed at the point in space (x, y, z) where the workpiece feature of interest will be located and is properly oriented at the correct attitude (pitch, yaw and roll). As further described below, the sensor calibration system 300 is operable to effect calibration of each of the sensors 240 with respect to a predetermined external reference frame, associated, for example, with the workpiece 100 or with the gauging station 200 itself.

The sensor calibration system 300 includes a portable reference target 400. The reference target 400 can be mounted on any suitable fixture, allowing it to be positioned in front of the feature sensor 240 for the calibration operation. For example, the reference target 400 may be attached to a simple tripod stand with cantilevered arm as shown in FIG. 3. It is readily understood that other types of mounting and positioning structures are within the scope of the present invention.

Figure 4A:
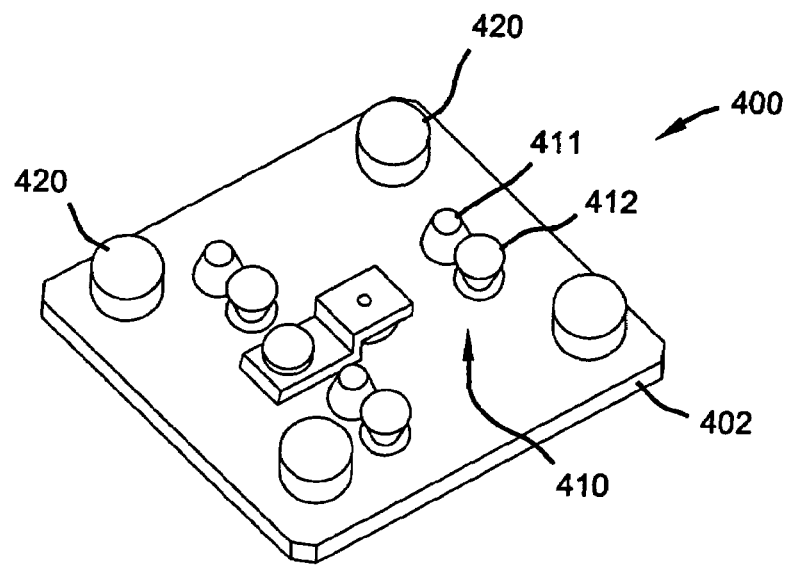
FIGS. 4A–4C depict an improved target assembly in accordance with the present invention.
Figure 4B:
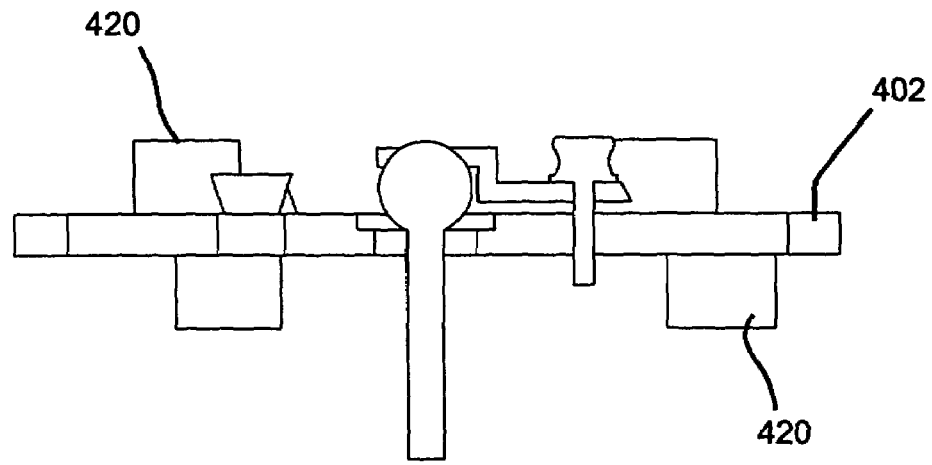
Figure 4C:
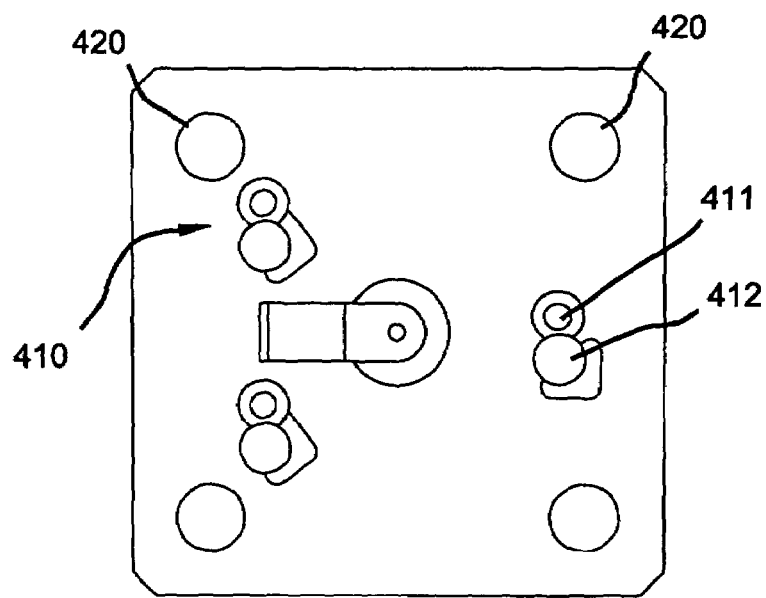

An improved reference target assembly 400 of the present invention is further described in relation to FIG. 4. The target assembly 400 is comprised generally of a plate member 402 and different targets mounted thereon. More specifically, sensor targets are comprised of at least three pairs of truncated cones 410, where each pair is positioned spatially apart from the other two pairs. For each pair of truncated cones, the truncated cones are mounted adjacent to each other on an upper surface of the plate member 402, such that one of the truncated cones 411 is orientated inversely in relation to the other cone 412. The inverted cone allows for compensation of any error associated with the measurement of a single cone. Although not limited thereto, each truncated cone preferably has a conical angle of approximately 25 degrees. In addition, portions of the plate member 402 may be cut away in an area adjacent to the truncated cones to prevent reflection of light by the plate during sensor measurements. While the following description is provided with reference to truncated cone targets, it is readily understood that other types of geometric shapes having symmetrically tapered surfaces that can be inverted in relation to each other (e.g., hemispheres, spheres, angled cylinders, tetrahedrons and other polyhedra) may be used as sensor targets.

The target assembly 400 also includes additional targets for calibrating the target assembly in relation to an external reference frame. Each of the targets are positioned spatially apart from each other and from the pairs of truncated cones. In an exemplary embodiment, a laser tracker is used to calibrate the target assembly to an external reference frame as will be further described below. Thus, the target assembly includes at least four nesting stations 420 mounted on the upper surface of the plate member 402, where each nesting station is configured to support a retroreflector associated with a laser tracker. Four additional nesting stations 422 may also be mounted onto the lower surface of the plate member 402. In this way, a minimum of three nesting stations are likely within the field of observation of the laser tracker.

Returning to FIG. 3, the sensor calibration system 300 further includes at least one target calibration device. For example, the target calibration device may be a servo driven laser tracker 310 as noted above. Briefly, a servo driven laser tracker 310 emits an outgoing laser beam and includes a servo drive mechanism with closed loop controller that points the laser tracker in the direction of a retroreflector. The retroreflector exhibits a reflective property, and thus will return an incoming beam of laser light towards the laser tracker. As long as the laser tracker is within the 45–60° field of view of the retroreflector, the laser tracker will precisely follow or track the position of the retroreflector. In this way, the laser track can capture positional data for each of the nesting stations on the target assembly as a retroreflector is moved amongst the different nesting stations.

Positional data captured by the laser tracker is reported with respect to a reference frame independent from the reference frame associated with the non-contact sensor. For example, the laser tracker may report positional data in relation a reference frame associated with a workpiece to be measured, a reference frame associated with the gauging station or some other external reference frame. Calibrating a laser tracker or some other target calibration device with respect to an external reference frame is previously known in the art. While the following description is provided with reference to a laser tracker, it is readily understood that other types of target calibration devices are also within broader aspects of the present invention.

Figure 5A:
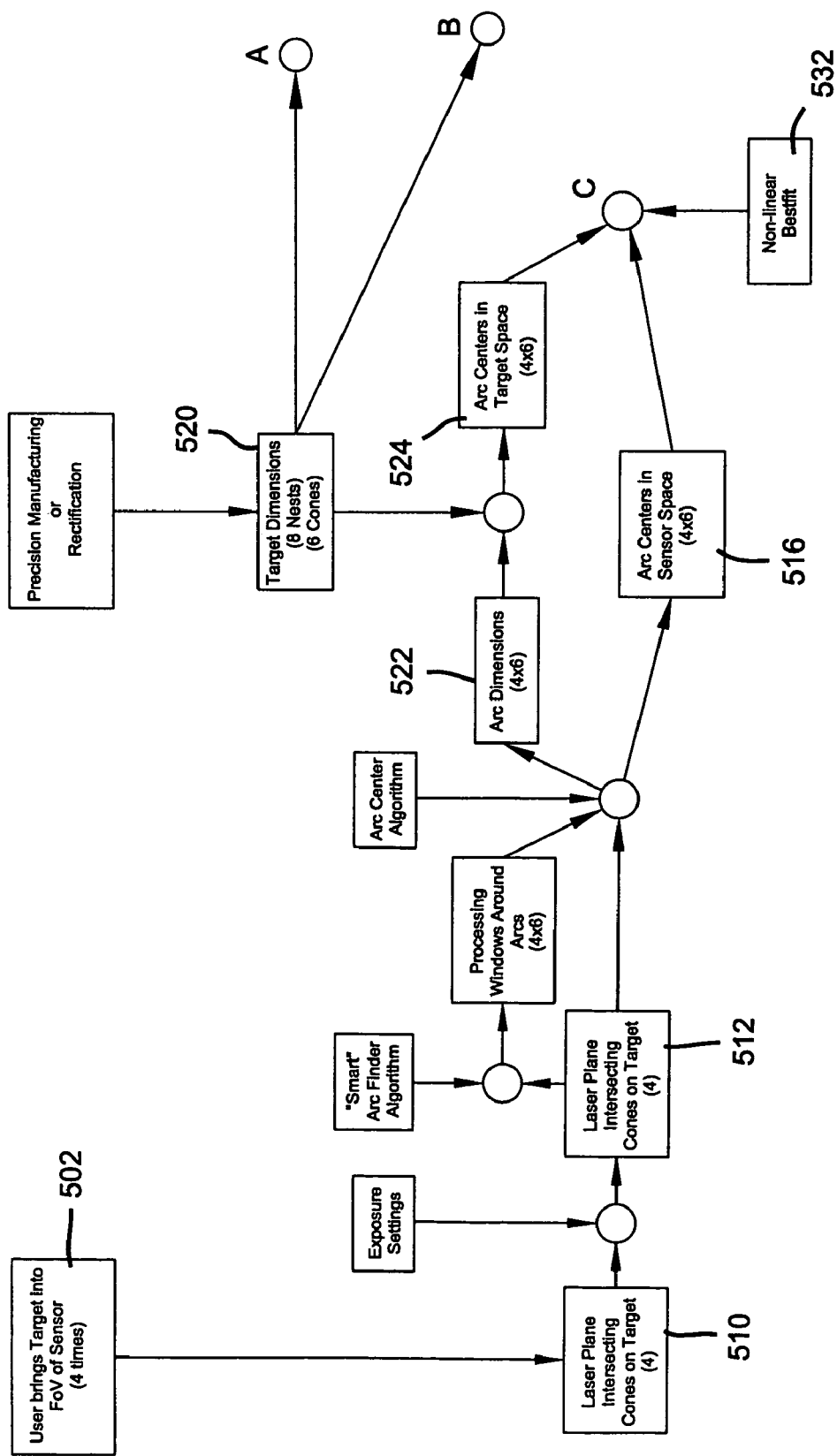
FIG. 5 is a flow diagram illustrating a method for calibrating a non-contact sensor according to the principles of the present invention.
Figure 5B:
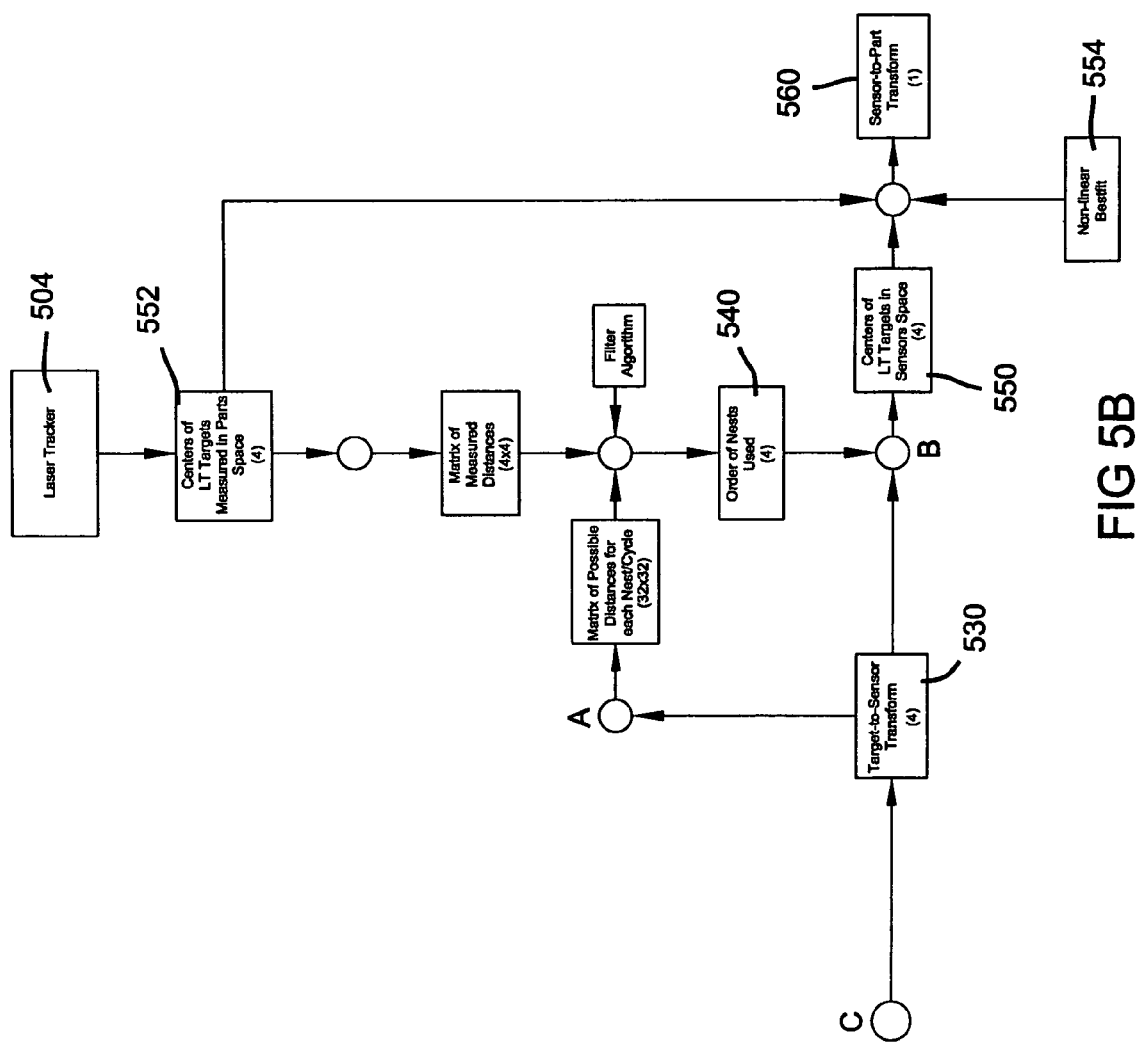

FIG. 5 illustrates a method for calibrating a non-contact sensor in accordance with the present invention. First, the target assembly is positioned coincidentally within the sensing zone of the non-contact sensor and within the field of observation of the laser tracker as shown at 502. The laser tracker may be positioned at a convenient vantage point in the gauging station, such as above the space that is occupied by the workpiece. It is envisioned that the laser tracker may be at a fixed vantage point, such as by mounting it to the gauging station, or temporarily positioned using a movable stand which allows the laser tracker to be moved from location to location throughout the manufacturing facility.

A retroreflector is placed in one of the nesting stations on the target assembly and positional data for the nesting station is captured by the laser tracker as indicated at 504. While the retroreflector is supported by the nesting station, image data of the target assembly is also captured by the non-contact sensor. Through the use of structure light, the sensor measures the diameter at which the laser plane strikes each of the cones on the target assembly. The measured diameter may then be used to discriminate the target position normal to the plane of light.

The retroreflector is then moved to at least two other nesting stations to ensure calibration of the sensor in six degrees of freedom. At each nesting station, position data is likewise captured by the laser tracker and image data is captured by the non-contact sensor. In the event that the target assembly is moved (even slightly) during this measurement process, measurement data is preferably taken when the retroreflector has been moved amongst at least four of the nesting stations. This fourth measurement is used to systematically determine the order in which the retroreflector was moved amongst the nesting stations as further described below. Rather than moving a single retroreflector amongst nesting stations, it is also envisioned that three or more retroreflectors may be concurrently positioned in designated nesting stations and laser tracker further configured to measure each of these positioned retroreflectors.

During sensor measurements, the laser plane of the sensor intersects the truncated cones on the target assembly as noted at 510. This intersection is captured as arcs in the image data 512. From the arcs in the image data, an axial center for each cone is derived in the sensor reference frame as indicated at 516. Based on six different target cones measured in four cycles, axial centers for each cone may be expressed in a 4×6 matrix.

Since the target assembly is precisely manufactured or could be precisely measured, its dimensions, including cone geometry, are known in the target reference frame as indicated at 520. Therefore, we can compute where the laser plane struck each individual cone in the target reference frame. To so do, arc diameters are derived at 522 from the image data. Based on these measured arc diameters, an axial center for each cone can be computed in the target reference frame as indicated at 524. Likewise, axial centers for each cone may be expressed in a 4×6 matrix.

Using data for the axial centers of each cone in both domains, a transform 530 is derived for each measurement cycle, where the transform relates the target reference frame to the sensor reference frame. In an exemplary embodiment, the transform is derived using a least squares optimization technique as shown at 532. It is readily understood that other techniques for deriving the transform may be employed and thus are within the scope of the present invention.

To convert positional data for the nesting stations in the target reference frame to positional data in the sensor reference frame, the order in which the retroreflector was placed in the nesting stations must be known. In one embodiment, the system operator may input the order into the sensor calibration system. In an alternative embodiment, the sensor calibration system may provide an automated approach for determining the nesting order. An exemplary algorithm for determining the nesting order from the captured measurement data is further described below.

Although it is not known which nesting station correlates to which measurement, positional data for one of the nesting stations is captured in each measurement cycle as noted above. In the case of four measurement cycles, the relative distance between any two points measured by the laser tracker can then be expressed in a 4×4 matrix form.

As a next step, possible relative distance measures between the nesting stations are iterated for each measurement cycle. Coordinates for each nesting station are known in the target coordinate frame. Possible distance measures for each measurement cycle are iterated by applying the transform for each measurement cycle to the known positional data for each nesting stations. These possible distance measures are then expressed relative to each of the other possible distance measures to form a 32×32 matrix of all the possible relative distance measured as defined in the sensor reference frame.

Although the target may move between measurement cycles, the sensor reference frame does not move in relation to the external reference frame. Therefore, the relative distance measures between the nesting stations will be the same in both the sensor reference frame and the external reference frame. By finding the relative distance values as measured by the laser tracker amongst the possible relative distance measures defined in this matrix, the order in which the retroreflector was placed in the nesting stations can be determined.

Figure 6:
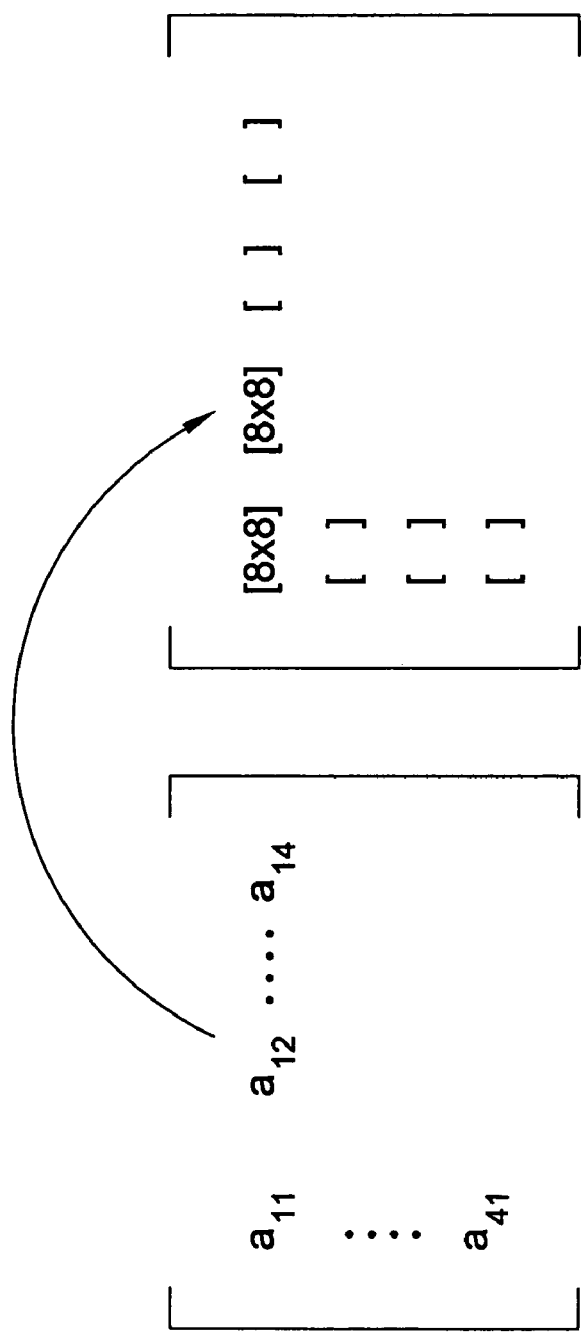
FIG. 6 is a diagram illustrating how distance measures are searched for amongst a larger matrix of possible distance measures.

As a first step, the larger 32×32 matrix is subdivided into sixteen 8×8 sub-matrices. Each element in the smaller matrix is then searched for in a corresponding sub-matrix of the larger matrix. For example, $a_{12}$ in the smaller matrix is searched for in the 8×8 sub-matrix as shown in FIG. 6. Within some predefined tolerance, if a match is found, the matching element in the larger matrix is set to one; whereas, non-matching elements are set to zero. Since any matches found in the sub-matrices found along the diagonal of the larger matrix are merely coincident, these matches can be reset to zero after the searching operation. The resulting matrix may be referred to as the hit matrix.

Each match represents a potential candidate for being the nesting station measured in a given measurement cycle. As constructed, the first eight rows of the hit matrix correlates to the first measurement cycle, the next eight rows of the hit matrix correlate to the second measurement cycle and so forth. Amongst a given set of eight rows, each different row correlates to hits for a different nesting station. For example, the first row correlates to the first nesting station; whereas, the second row correlates to the second nesting station. To simplify the assessment, hits for potential candidates may be summarized in a smaller (8×4) matrix by summing the hits across each row of the hit matrix as shown below, where each row of the condensed matrix corresponds to a given nesting station and each column of the condensed matrix corresponds to a given measurement cycle.

$$\begin{pmatrix} 1 & 0 & 3 & 1 \\ 0 & 0 & 1 & 3 \\ 3 & 0 & 2 & 0 \\ 0 & 3 & 0 & 0 \\ 0 & 1 & 0 & 0 \\ 0 & 0 & 0 & 0 \\ 0 & 0 & 0 & 0 \\ 0 & 0 & 0 & 0 \end{pmatrix}$$

It is readily understood that due to the symmetry of the hit matrix, it may also be condensed by summing within each row in a similar manner.

In this approach, potential candidates for nesting stations that were measured are identified as having three hits (i.e., the number of measurement cycles minus one). If there are only four candidates, then the order in which the retroreflector was placed in the nesting stations is known. In the exemplary matrix provided above, the order was identified as {3,4,1,2}.

Due to coincidental hits, there may be more than four candidates in some instances. To address this scenario, further filtering of the data is required. Certain nesting stations can be ruled out as potential candidates. In particular, nesting stations whose rows in the condensed matrix has all of its values less than three can be ruled out as potential candidates. Therefore, all hits for this nesting station must have been coincidental and thus can be set to zero in the hit matrix. The condensed matrix can then be reformulated from the revised data in the hit matrix in the same manner as described below. Likewise, the condensed matrix can be inspected in the manner described above to identify potential candidates. If the number of potential candidates still exceeds four, the process may be repeated. Through empirical testing it has been found that two iterations may be needed to find a unique solution; otherwise, it is assumed an error has occurred in the calibration process.

Given positional data for the nesting stations in the target reference frame and the order in which the retroreflector was placed in the nesting stations, positional data for the nesting stations can be defined in the sensor reference frame as indicated at 550. In particular, positional data for the nesting stations is converted from the target reference frame to the sensor reference frame using the target-to-sensor transform.

Lastly, positional data for the nesting stations as captured by the laser tracker at 552 and positional data for the nesting stations defined in the sensor reference frame 550 can be used to derive a second transform 560 between these two domains. Again, the transform is derived using a least squares optimization technique at 554, although other techniques are within the scope of the present invention. Using this transform, measurements taken by the sensor in the sensor reference frame may be converted to the external reference frame, thereby calibrating the sensor with respect to this external reference frame.

For illustration purposes, an exemplary computation using the calibration method of present invention is set forth in Appendix below.

The description of the invention is merely exemplary in nature and, thus, variations that do not depart from the gist of the invention are intended to be within the scope of the invention. Such variations are not to be regarded as a departure from the spirit and scope of the invention.

APPENDIX

We are trying to find a Sensor-to-Part transform:

$$\text{SensorToPart}(Tx, Ty, Tz, Rz, Ry, Rx) := \text{Trans}(Tx, Ty, Tz) \cdot \text{RotZ}(Rz) \cdot \text{RotY}(Ry) \cdot \text{RotX}(Rx)$$

We know the centers of the cones in Target Space either because they are precision manufactured, or from their rectification data:

ConeCentersTS :=

| X | Y | Z | |
|---|---|---|---|
| 0 | 22.5 | 22.5 | 1 |
| 0 | 14.5 | 19.5 | 1 |
| 0 | 4.25 | -19.5 | 1 |
| 0 | -4.25 | -22.5 | 1 |
| 0 | -14.5 | 22.5 | 1 |
| 0 | -22.5 | 19.5 | 1 |

We have 6 cones per target:

$N := 6$ $i := 0 .. N - 1$ $\text{ConeCentersTS} := \text{ConeCentersTS}^T \qquad \text{ConeCenterTS}_i := \text{ConeCentersTS}^{\langle i \rangle}$ $$\text{ConeCenterTS}^T = \left[ \begin{pmatrix} 0 \\ 22.5 \\ 22.5 \\ 1 \end{pmatrix} \begin{pmatrix} 0 \\ 14.5 \\ 19.5 \\ 1 \end{pmatrix} \begin{pmatrix} 0 \\ 4.25 \\ -19.5 \\ 1 \end{pmatrix} \begin{pmatrix} 0 \\ -4.25 \\ -22.5 \\ 1 \end{pmatrix} \begin{pmatrix} 0 \\ -14.5 \\ 22.5 \\ 1 \end{pmatrix} \begin{pmatrix} 0 \\ -22.5 \\ 19.5 \\ 1 \end{pmatrix} \right]$$

Their direction in Target Space:

ConeDirectionsTS =

| X | Y | Z | |
|---|---|---|---|
| 1 | 0 | 0 | 0 |
| 1 | 0 | 0 | 0 |
| 1 | 0 | 0 | 0 |
| 1 | 0 | 0 | 0 |
| 1 | 0 | 0 | 0 |
| 1 | 0 | 0 | 0 |

$\text{ConeDirectionsTS} = \text{ConeDirectionsTS}^T \qquad \text{ConeDirectionTS}_i := \text{ConeDirectionsTS}^{\langle i \rangle}$ $$\text{ConeDirectionTS}^T = \left[ \begin{pmatrix} 1 \\ 0 \\ 0 \\ 0 \end{pmatrix} \begin{pmatrix} 1 \\ 0 \\ 0 \\ 0 \end{pmatrix} \begin{pmatrix} 1 \\ 0 \\ 0 \\ 0 \end{pmatrix} \begin{pmatrix} 1 \\ 0 \\ 0 \\ 0 \end{pmatrix} \begin{pmatrix} 1 \\ 0 \\ 0 \\ 0 \end{pmatrix} \begin{pmatrix} 1 \\ 0 \\ 0 \\ 0 \end{pmatrix} \right]$$

The Diameter at their center and their growth ratio:

$\text{ConeTopDiameter} := 5 \qquad \text{ConeHeight} := 5 \qquad \text{ConeAngle} := 25 \cdot \text{deg}$ $\text{SingleConeRatio} := (2 \cdot \tan(\text{ConeAngle}))^{-1}$ $\text{ConeCenterDiameter} := \text{ConeTopDiameter} + \dfrac{\text{ConeHeight}}{\text{SingleConeRatio}}$ $$\text{ConeCenterDiameter} = \begin{pmatrix} 7.332 \\ 7.332 \\ 7.332 \\ 7.332 \\ 7.332 \\ 7.332 \end{pmatrix}$$

Three of the Cones are mounted up-side down:

$$\text{ConeRatio} := \begin{pmatrix} \text{SingleConeRatio} \\ -\text{SingleConeRatio} \\ \text{SingleConeRatio} \\ -\text{SingleConeRatio} \\ \text{SingleConeRatio} \\ -\text{SingleConeRatio} \end{pmatrix} \quad \text{ConeRatio} = \begin{pmatrix} 1.072 \\ -1.072 \\ 1.072 \\ -1.072 \\ 1.072 \\ -1.072 \end{pmatrix} \quad \text{SingleConeRatio} = \text{SingleConeRatio}$$

The Centers of the LaserTracker Targets in TargetSpace (we have eight Target Nests):

LTCentersTS :=

| Centers of LT Targets in Target Space | | | |
|---|---|---|---|
| 10.2 | 30 | 32 | 1 |
| 10.2 | 34 | -27.5 | 1 |
| 10.2 | -34 | -27.5 | 1 |
| 10.2 | -34 | 24 | 1 |
| -19.2 | -29 | 29 | 1 |
| -19.2 | -32 | -20.5 | 1 |
| -19.2 | 34 | -20.5 | 1 |
| -19.2 | 28.5 | 25 | 1 |

$K := 8$ $j := 0 .. K - 1$ $k := 0 .. K - 1$ $\text{LTCentersTS} := \text{LTCentersTS}^T \quad \text{LTCenterTS}_j := \text{LTCentersTS}^{(j)}$ $$\text{LTCenterTS}^T = \left[ \begin{pmatrix} 10.2 \\ 30 \\ 32 \\ 1 \end{pmatrix} \begin{pmatrix} 10.2 \\ 34 \\ -27.5 \\ 1 \end{pmatrix} \begin{pmatrix} 10.2 \\ -34 \\ -27.5 \\ 1 \end{pmatrix} \begin{pmatrix} 10.2 \\ -34 \\ 24 \\ 1 \end{pmatrix} \begin{pmatrix} -19.2 \\ -29 \\ 29 \\ 1 \end{pmatrix} \begin{pmatrix} -19.2 \\ -32 \\ -20.5 \\ 1 \end{pmatrix} \begin{pmatrix} -19.2 \\ 34 \\ -20.5 \\ 1 \end{pmatrix} \begin{pmatrix} -19.2 \\ 28.5 \\ 25 \\ 1 \end{pmatrix} \right]$$

$\text{LTDist}_{j,k} := |\text{LTCenterTS}_j - \text{LTCenterTS}_k|$

This table is for reference purpose only $$\text{LTDist} = \begin{pmatrix} 0 & 59.634 & 87.386 & 64.498 & 65.988 & 86.398 & 60.304 & 30.259 \\ 59.634 & 0 & 68 & 85.301 & 89.586 & 72.59 & 30.222 & 60.422 \\ 87.386 & 68 & 0 & 51.5 & 63.887 & 30.288 & 74.413 & 86.757 \\ 64.498 & 85.301 & 51.5 & 0 & 30.238 & 53.372 & 86.421 & 69.077 \\ 65.988 & 89.586 & 63.887 & 30.238 & 0 & 49.591 & 80.12 & 57.639 \\ 86.398 & 72.59 & 30.288 & 53.372 & 49.591 & 0 & 66 & 75.7 \\ 60.304 & 30.222 & 74.413 & 86.421 & 80.12 & 66 & 0 & 45.831 \\ 30.259 & 60.422 & 86.757 & 69.077 & 57.639 & 75.7 & 45.831 & 0 \end{pmatrix}$$

From the algorithm, we get 6 Diameters and 6 Arc Centers in the y-z plane of the Sensor Space. We have to run the algorithm 4 tim for four different cycles: every time the User puts the LaserTracker target into a new nest. We have to be able to deal with the possi that the target might get "bumped" between cycles, that is why we are assuming to get four different target positions for the four diff cycles:

$$M := 4$$

$$m := 0 .. M - 1$$

$ConeIntersSS_0 :=$

| Measured Cone Centers Cycle 1 | | | |
|---|---|---|---|
| 0 | 26 | 29.881 | 1 |
| 0 | 17.909 | 26.811 | 1 |
| 0 | 8.663 | -12.673 | 1 |
| 0 | 0.218 | -15.673 | 1 |
| 0 | -11.07 | 29.012 | 1 |
| 0 | -18.978 | 25.714 | 1 |

$ConeMeasDia^{(0)} :=$

| Measured Diameter |
|---|
| 8.655 |
| 6.761 |
| 8.533 |
| 6.554 |
| 8.035 |
| 6.864 |

$ConeIntersSS_1 :=$

| Measured Cone Centers Cycle 2 | | | |
|---|---|---|---|
| 0 | 26.096 | 29.634 | 1 |
| 0 | 17.987 | 26.605 | 1 |
| 0 | 8.552 | -12.691 | 1 |
| 0 | 0.081 | -15.704 | 1 |
| 0 | -10.924 | 29.072 | 1 |
| 0 | -18.89 | 25.965 | 1 |

$ConeMeasDia^{(1)} :=$

| Measured Diameter |
|---|
| 8.338 |
| 6.647 |
| 8.673 |
| 6.352 |
| 7.886 |
| 7.143 |

$ConeIntersSS_2 :=$

| Measured Cone Centers Cycle 3 | | | |
|---|---|---|---|
| 0 | 25.885 | 29.846 | 1 |
| 0 | 17.871 | 26.748 | 1 |
| 0 | 8.68 | -12.556 | 1 |
| 0 | 0.347 | -15.72 | 1 |
| 0 | -11.166 | 28.928 | 1 |
| 0 | -19.013 | 25.633 | 1 |

$ConeMeasDia^{(2)} :=$

| Measured Diameter |
|---|
| 8.314 |
| 6.662 |
| 8.486 |
| 6.626 |
| 8.226 |
| 6.503 |

$ConeIntersSS_3 :=$

| Measured Cone Centers Cycle 4 | | | |
|---|---|---|---|
| 0 | 25.886 | 29.873 | 1 |
| 0 | 17.872 | 26.751 | 1 |
| 0 | 8.697 | -12.576 | 1 |
| 0 | 0.345 | -15.696 | 1 |
| 0 | -11.17 | 28.905 | 1 |
| 0 | -19.018 | 25.695 | 1 |

$ConeMeasDia^{(3)} :=$

| Measured Diameter |
|---|
| 8.348 |
| 6.671 |
| 8.453 |
| 6.639 |
| 8.194 |
| 6.627 |

$ConeIntersSS_m := (ConeIntersSS_m)^T \qquad ConeInterSS_{m,i} := (ConeIntersSS_m)^{\langle i \rangle} \qquad ConeMeasDia := ConeMeasDia^T$ $$\text{ConeInterSS} = \begin{bmatrix} \begin{pmatrix} 0 \\ 26 \\ 29.881 \\ 1 \end{pmatrix} & \begin{pmatrix} 0 \\ 17.909 \\ 26.811 \\ 1 \end{pmatrix} & \begin{pmatrix} 0 \\ 8.663 \\ -12.673 \\ 1 \end{pmatrix} & \begin{pmatrix} 0 \\ 0.218 \\ -15.673 \\ 1 \end{pmatrix} & \begin{pmatrix} 0 \\ -11.07 \\ 29.012 \\ 1 \end{pmatrix} & \begin{pmatrix} 0 \\ -18.978 \\ 25.714 \\ 1 \end{pmatrix} \\ \begin{pmatrix} 0 \\ 26.096 \\ 29.634 \\ 1 \end{pmatrix} & \begin{pmatrix} 0 \\ 17.987 \\ 26.605 \\ 1 \end{pmatrix} & \begin{pmatrix} 0 \\ 8.552 \\ -12.691 \\ 1 \end{pmatrix} & \begin{pmatrix} 0 \\ 0.081 \\ -15.704 \\ 1 \end{pmatrix} & \begin{pmatrix} 0 \\ -10.924 \\ 29.072 \\ 1 \end{pmatrix} & \begin{pmatrix} 0 \\ -18.89 \\ 25.965 \\ 1 \end{pmatrix} \\ \begin{pmatrix} 0 \\ 25.885 \\ 29.846 \\ 1 \end{pmatrix} & \begin{pmatrix} 0 \\ 17.871 \\ 26.748 \\ 1 \end{pmatrix} & \begin{pmatrix} 0 \\ 8.68 \\ -12.556 \\ 1 \end{pmatrix} & \begin{pmatrix} 0 \\ 0.347 \\ -15.72 \\ 1 \end{pmatrix} & \begin{pmatrix} 0 \\ -11.166 \\ 28.928 \\ 1 \end{pmatrix} & \begin{pmatrix} 0 \\ -19.013 \\ 25.633 \\ 1 \end{pmatrix} \\ \begin{pmatrix} 0 \\ 25.886 \\ 29.873 \\ 1 \end{pmatrix} & \begin{pmatrix} 0 \\ 17.872 \\ 26.751 \\ 1 \end{pmatrix} & \begin{pmatrix} 0 \\ 8.697 \\ -12.576 \\ 1 \end{pmatrix} & \begin{pmatrix} 0 \\ 0.345 \\ -15.696 \\ 1 \end{pmatrix} & \begin{pmatrix} 0 \\ -11.17 \\ 28.905 \\ 1 \end{pmatrix} & \begin{pmatrix} 0 \\ -19.018 \\ 25.695 \\ 1 \end{pmatrix} \end{bmatrix}$$

$$\text{ConeMeasDia} = \begin{pmatrix} 8.655 & 6.761 & 8.533 & 6.554 & 8.035 & 6.864 \\ 8.338 & 6.647 & 8.673 & 6.352 & 7.886 & 7.143 \\ 8.314 & 6.662 & 8.486 & 6.626 & 8.226 & 6.503 \\ 8.348 & 6.671 & 8.453 & 6.639 & 8.194 & 6.627 \end{pmatrix}$$

Based on the measured Diameters, we can compute where the LaserLine must have striked the indiviual cones in Target Space:

$$\text{ConeInterTS}_{m,i} := \text{ConeCenterTS} + (\text{ConeCenterDiameter} - \text{ConeMeasDia}_{m,i}) \cdot \text{ConeRatio} \cdot \text{ConeDirectionTS}$$

$$\text{ConeInterTS} = \begin{bmatrix} \begin{pmatrix} -1.419 \\ 22.5 \\ 22.5 \\ 1 \end{pmatrix} & \begin{pmatrix} -0.612 \\ 14.5 \\ 19.5 \\ 1 \end{pmatrix} & \begin{pmatrix} -1.288 \\ 4.25 \\ -19.5 \\ 1 \end{pmatrix} & \begin{pmatrix} -0.834 \\ -4.25 \\ -22.5 \\ 1 \end{pmatrix} & \begin{pmatrix} -0.754 \\ -14.5 \\ 22.5 \\ 1 \end{pmatrix} & \begin{pmatrix} -0.501 \\ -22.5 \\ 19.5 \\ 1 \end{pmatrix} \\ \begin{pmatrix} -1.079 \\ 22.5 \\ 22.5 \\ 1 \end{pmatrix} & \begin{pmatrix} -0.734 \\ 14.5 \\ 19.5 \\ 1 \end{pmatrix} & \begin{pmatrix} -1.438 \\ 4.25 \\ -19.5 \\ 1 \end{pmatrix} & \begin{pmatrix} -1.05 \\ -4.25 \\ -22.5 \\ 1 \end{pmatrix} & \begin{pmatrix} -0.595 \\ -14.5 \\ 22.5 \\ 1 \end{pmatrix} & \begin{pmatrix} -0.202 \\ -22.5 \\ 19.5 \\ 1 \end{pmatrix} \\ \begin{pmatrix} -1.053 \\ 22.5 \\ 22.5 \\ 1 \end{pmatrix} & \begin{pmatrix} -0.718 \\ 14.5 \\ 19.5 \\ 1 \end{pmatrix} & \begin{pmatrix} -1.238 \\ 4.25 \\ -19.5 \\ 1 \end{pmatrix} & \begin{pmatrix} -0.757 \\ -4.25 \\ -22.5 \\ 1 \end{pmatrix} & \begin{pmatrix} -0.959 \\ -14.5 \\ 22.5 \\ 1 \end{pmatrix} & \begin{pmatrix} -0.888 \\ -22.5 \\ 19.5 \\ 1 \end{pmatrix} \\ \begin{pmatrix} -1.09 \\ 22.5 \\ 22.5 \\ 1 \end{pmatrix} & \begin{pmatrix} -0.708 \\ 14.5 \\ 19.5 \\ 1 \end{pmatrix} & \begin{pmatrix} -1.202 \\ 4.25 \\ -19.5 \\ 1 \end{pmatrix} & \begin{pmatrix} -0.743 \\ -4.25 \\ -22.5 \\ 1 \end{pmatrix} & \begin{pmatrix} -0.925 \\ -14.5 \\ 22.5 \\ 1 \end{pmatrix} & \begin{pmatrix} -0.755 \\ -22.5 \\ 19.5 \\ 1 \end{pmatrix} \end{bmatrix}$$

Alternatively, we can first compute the center between each pair of cones, and use those three points for a best fit: $h := 0 .. \frac{N}{2} - 1$ $$\text{ConeMiddleSS}_{m,h} := \frac{\text{ConeInterSS}_{m,2 \cdot h} + \text{ConeInterSS}_{m,2 \cdot h+1}}{2}$$

$$\text{ConeMiddleTS}_{m,h} := \frac{\text{ConeInterTS}_{m,2 \cdot h} + \text{ConeInterTS}_{m,2 \cdot h+1}}{2}$$

$$\text{ConeMiddleSS} = \begin{bmatrix} \begin{pmatrix} 0 \\ 21.954 \\ 28.346 \\ 1 \end{pmatrix} \begin{pmatrix} 0 \\ 4.441 \\ -14.173 \\ 1 \end{pmatrix} \begin{pmatrix} 0 \\ -15.024 \\ 27.363 \\ 1 \end{pmatrix} \\ \begin{pmatrix} 0 \\ 22.041 \\ 28.12 \\ 1 \end{pmatrix} \begin{pmatrix} 0 \\ 4.316 \\ -14.198 \\ 1 \end{pmatrix} \begin{pmatrix} 0 \\ -14.907 \\ 27.518 \\ 1 \end{pmatrix} \\ \begin{pmatrix} 0 \\ 21.878 \\ 28.297 \\ 1 \end{pmatrix} \begin{pmatrix} 0 \\ 4.513 \\ -14.138 \\ 1 \end{pmatrix} \begin{pmatrix} 0 \\ -15.09 \\ 27.28 \\ 1 \end{pmatrix} \\ \begin{pmatrix} 0 \\ 21.879 \\ 28.312 \\ 1 \end{pmatrix} \begin{pmatrix} 0 \\ 4.521 \\ -14.136 \\ 1 \end{pmatrix} \begin{pmatrix} 0 \\ -15.094 \\ 27.3 \\ 1 \end{pmatrix} \end{bmatrix}$$

$$\text{ConeMiddleTS} = \begin{bmatrix} \begin{pmatrix} -1.015 \\ 18.5 \\ 21 \\ 1 \end{pmatrix} \begin{pmatrix} -1.061 \\ 0 \\ -21 \\ 1 \end{pmatrix} \begin{pmatrix} -0.628 \\ -18.5 \\ 21 \\ 1 \end{pmatrix} \\ \begin{pmatrix} -0.907 \\ 18.5 \\ 21 \\ 1 \end{pmatrix} \begin{pmatrix} -1.244 \\ 0 \\ -21 \\ 1 \end{pmatrix} \begin{pmatrix} -0.398 \\ -18.5 \\ 21 \\ 1 \end{pmatrix} \\ \begin{pmatrix} -0.886 \\ 18.5 \\ 21 \\ 1 \end{pmatrix} \begin{pmatrix} -0.997 \\ 0 \\ -21 \\ 1 \end{pmatrix} \begin{pmatrix} -0.924 \\ -18.5 \\ 21 \\ 1 \end{pmatrix} \\ \begin{pmatrix} -0.899 \\ 18.5 \\ 21 \\ 1 \end{pmatrix} \begin{pmatrix} -0.973 \\ 0 \\ -21 \\ 1 \end{pmatrix} \begin{pmatrix} -0.84 \\ -18.5 \\ 21 \\ 1 \end{pmatrix} \end{bmatrix}$$

We try to find Target-to-Sensor transforms that minimize the sum of the distances between the Intersections in Sensor Space and the Intersections in Target Space with the transform applied to them:

$\text{TargetToSensor}(\text{SixSpace}) := \text{Trans}(\text{SixSpace}_0, \text{SixSpace}_1, \text{SixSpace}_2) \cdot \text{RotZ}(\text{SixSpace}_3) \cdot \text{RotY}(\text{SixSpace}_4) \cdot \text{RotX}(\text{SixSpace}_5)$ Remark: MathCAD does not allow range variables in Solve Blocks (between "Given" and "MinErr"). That is why there is a separate b for each of the 4 cycles. The equations are exactly the same, just different indeces.
As start values, we chose all Translations and Rotations to be 0:

$\text{SixSpace}_q := 0$ $\text{SixSpace}_3 := 0$

Cycle 1:

Given $\text{TargetToSensor}(\text{SixSpace}) \cdot \text{ConeInterTS}_{0,0} = \text{ConeInterSS}_{0,0}$ $\text{TargetToSensor}(\text{SixSpace}) \cdot \text{ConeInterTS}_{0,1} = \text{ConeInterSS}_{0,1}$ $\text{TargetToSensor}(\text{SixSpace}) \cdot \text{ConeInterTS}_{0,2} = \text{ConeInterSS}_{0,2}$ $\text{TargetToSensor}(\text{SixSpace}) \cdot \text{ConeInterTS}_{0,3} = \text{ConeInterSS}_{0,3}$ $\text{TargetToSensor}(\text{SixSpace}) \cdot \text{ConeInterTS}_{0,4} = \text{ConeInterSS}_{0,4}$ $\text{TargetToSensor}(\text{SixSpace}) \cdot \text{ConeInterTS}_{0,5} = \text{ConeInterSS}_{0,5}$ Result := MinErr(SixSpace)

$Tx_0 := \text{Result}_0 \qquad Ty_0 := \text{Result}_1 \qquad Tz_0 := \text{Result}_2 \qquad Rz_0 := \text{Result}_3 \qquad Ry_0 := \text{Result}_4 \qquad Rx_0 := \text{Result}_5$ Given $\text{TargetToSensor(SixSpace3)} \cdot \text{ConeMiddleTS}_{0,0} = \text{ConeMiddleSS}_{0,0}$ $\text{TargetToSensor(SixSpace3)} \cdot \text{ConeMiddleTS}_{0,1} = \text{ConeMiddleSS}_{0,1}$ $\text{TargetToSensor(SixSpace3)} \cdot \text{ConeMiddleTS}_{0,2} = \text{ConeMiddleSS}_{0,2}$ Result := Minerr(SixSpace3)

$Tx3_0 := \text{Result}$  $Ty3_0 := \text{Result}$  $Tz3_0 := \text{Result}$  $Rz3_0 := \text{Result}$  $Ry3_0 := \text{Result}$  $Rx3_0 := \text{Result}$ Cycle 2:

Given $\text{TargetToSensor(SixSpace)} \cdot \text{ConeInterTS}_{1,0} = \text{ConeInterSS}_{1,0}$ $\text{TargetToSensor(SixSpace)} \cdot \text{ConeInterTS}_{1,1} = \text{ConeInterSS}_{1,1}$ $\text{TargetToSensor(SixSpace)} \cdot \text{ConeInterTS}_{1,2} = \text{ConeInterSS}_{1,2}$ $\text{TargetToSensor(SixSpace)} \cdot \text{ConeInterTS}_{1,3} = \text{ConeInterSS}_{1,3}$ $\text{TargetToSensor(SixSpace)} \cdot \text{ConeInterTS}_{1,4} = \text{ConeInterSS}_{1,4}$ $\text{TargetToSensor(SixSpace)} \cdot \text{ConeInterTS}_{1,5} = \text{ConeInterSS}_{1,5}$ Result := Minerr(SixSpace)

$Tx_1 := \text{Result}$  $Ty_1 := \text{Result}$  $Tz_1 := \text{Result}$  $Rz_1 := \text{Result}$  $Ry_1 := \text{Result}$  $Rx_1 := \text{Result}$ Given $\text{TargetToSensor(SixSpace3)} \cdot \text{ConeMiddleTS}_{1,0} = \text{ConeMiddleSS}_{1,0}$ $\text{TargetToSensor(SixSpace3)} \cdot \text{ConeMiddleTS}_{1,1} = \text{ConeMiddleSS}_{1,1}$ $\text{TargetToSensor(SixSpace3)} \cdot \text{ConeMiddleTS}_{1,2} = \text{ConeMiddleSS}_{1,2}$ Result := Minerr(SixSpace3)

$Tx3_1 := \text{Result}$  $Ty3_1 := \text{Result}$  $Tz3_1 := \text{Result}$  $Rz3_1 := \text{Result}$  $Ry3_1 := \text{Result}$  $Rx3_1 := \text{Result}$ Cycle 3:

Given $\text{TargetToSensor(SixSpace)} \cdot \text{ConeInterTS}_{2,0} = \text{ConeInterSS}_{2,0}$ $\text{TargetToSensor(SixSpace)} \cdot \text{ConeInterTS}_{2,1} = \text{ConeInterSS}_{2,1}$ $\text{TargetToSensor(SixSpace)} \cdot \text{ConeInterTS}_{2,2} = \text{ConeInterSS}_{2,2}$ $\text{TargetToSensor(SixSpace)} \cdot \text{ConeInterTS}_{2,3} = \text{ConeInterSS}_{2,3}$ $\text{TargetToSensor(SixSpace)} \cdot \text{ConeInterTS}_{2,4} = \text{ConeInterSS}_{2,4}$ $\text{TargetToSensor(SixSpace)} \cdot \text{ConeInterTS}_{2,5} = \text{ConeInterSS}_{2,5}$ Result := Minerr(SixSpace)

$Tx_2 := \text{Result}$  $Ty_2 := \text{Result}$  $Tz_2 := \text{Result}$  $Rz_2 := \text{Result}$  $Ry_2 := \text{Result}$  $Rx_2 := \text{Result}$ $$RMS3_m := \sqrt{\frac{\sum_h (|Residual3_{m,h}|)^2}{\frac{N}{2}}}$$

$$RMS3 = \begin{pmatrix} 0.045 \\ 0.028 \\ 0.03 \\ 0.022 \end{pmatrix} \quad Tx3 = \begin{pmatrix} 0.941 \\ 0.948 \\ 0.951 \\ 0.921 \end{pmatrix} \quad Ty3 = \begin{pmatrix} 3.952 \\ 3.925 \\ 3.957 \\ 3.957 \end{pmatrix} \quad Tz3 = \begin{pmatrix} 6.852 \\ 6.827 \\ 6.818 \\ 6.83 \end{pmatrix}$$

$$Rz3 = \begin{pmatrix} -0.608 \\ -0.801 \\ 0.056 \\ -0.095 \end{pmatrix} \deg \quad Ry3 = \begin{pmatrix} -0.312 \\ -0.794 \\ -0.128 \\ -0.138 \end{pmatrix} \deg \quad Rx3 = \begin{pmatrix} 1.402 \\ 0.993 \\ 1.546 \\ 1.551 \end{pmatrix} \deg$$

$$TtoS = \begin{bmatrix} \begin{pmatrix} 1 & 0.014 & -0.005 & 0.936 \\ -0.014 & 1 & -0.024 & 3.946 \\ 0.005 & 0.024 & 1 & 6.852 \\ 0 & 0 & 0 & 1 \end{pmatrix} \\ \begin{pmatrix} 1 & 0.016 & -0.014 & 0.945 \\ -0.017 & 1 & -0.017 & 3.92 \\ 0.013 & 0.017 & 1 & 6.826 \\ 0 & 0 & 0 & 1 \end{pmatrix} \\ \begin{pmatrix} 1 & 0.002 & -0.002 & 0.947 \\ -0.002 & 1 & -0.027 & 3.954 \\ 0.002 & 0.027 & 1 & 6.817 \\ 0 & 0 & 0 & 1 \end{pmatrix} \\ \begin{pmatrix} 1 & 0.004 & -0.002 & 0.917 \\ -0.004 & 1 & -0.027 & 3.953 \\ 0.002 & 0.027 & 1 & 6.829 \\ 0 & 0 & 0 & 1 \end{pmatrix} \end{bmatrix} \quad TtoS3 = \begin{bmatrix} \begin{pmatrix} 1 & 0.01 & -0.006 & 0.941 \\ -0.011 & 1 & -0.024 & 3.952 \\ 0.005 & 0.024 & 1 & 6.852 \\ 0 & 0 & 0 & 1 \end{pmatrix} \\ \begin{pmatrix} 1 & 0.014 & -0.014 & 0.948 \\ -0.014 & 1 & -0.017 & 3.925 \\ 0.014 & 0.017 & 1 & 6.827 \\ 0 & 0 & 0 & 1 \end{pmatrix} \\ \begin{pmatrix} 1 & -0.001 & -0.002 & 0.951 \\ 0.001 & 1 & -0.027 & 3.957 \\ 0.002 & 0.027 & 1 & 6.818 \\ 0 & 0 & 0 & 1 \end{pmatrix} \\ \begin{pmatrix} 1 & 0.002 & -0.002 & 0.921 \\ -0.002 & 1 & -0.027 & 3.957 \\ 0.002 & 0.027 & 1 & 6.83 \\ 0 & 0 & 0 & 1 \end{pmatrix} \end{bmatrix}$$

$$Residual = \begin{bmatrix} \begin{pmatrix} 0.277 \\ 0.084 \\ -0.001 \\ 0 \end{pmatrix} \begin{pmatrix} -0.432 \\ -0.071 \\ 0.118 \\ 0 \end{pmatrix} \begin{pmatrix} 0.195 \\ -0.019 \\ -0.127 \\ 0 \end{pmatrix} \begin{pmatrix} -0.154 \\ -0.033 \\ 0.075 \\ 0 \end{pmatrix} \begin{pmatrix} 0.135 \\ 0.009 \\ 0.021 \\ 0 \end{pmatrix} \begin{pmatrix} -0.02 \\ 0.03 \\ -0.086 \\ 0 \end{pmatrix} \\ \begin{pmatrix} 0.073 \\ 0.041 \\ -0.054 \\ 0 \end{pmatrix} \begin{pmatrix} -0.182 \\ -0.115 \\ 0.047 \\ 0 \end{pmatrix} \begin{pmatrix} 0.16 \\ 0.033 \\ -0.075 \\ 0 \end{pmatrix} \begin{pmatrix} -0.13 \\ 0.016 \\ 0.05 \\ 0 \end{pmatrix} \begin{pmatrix} 0.191 \\ 0.019 \\ 0.005 \\ 0 \end{pmatrix} \begin{pmatrix} -0.111 \\ 0.007 \\ 0.027 \\ 0 \end{pmatrix} \\ \begin{pmatrix} 0.108 \\ 0.042 \\ -0.067 \\ 0 \end{pmatrix} \begin{pmatrix} -0.22 \\ -0.055 \\ 0.049 \\ 0 \end{pmatrix} \begin{pmatrix} 0.252 \\ -0.049 \\ 0.007 \\ 0 \end{pmatrix} \begin{pmatrix} -0.221 \\ 0.035 \\ 0.07 \\ 0 \end{pmatrix} \begin{pmatrix} 0.072 \\ -0.022 \\ 0.01 \\ 0 \end{pmatrix} \begin{pmatrix} 0.009 \\ 0.048 \\ -0.071 \\ 0 \end{pmatrix} \\ \begin{pmatrix} 0.117 \\ 0.041 \\ -0.051 \\ 0 \end{pmatrix} \begin{pmatrix} -0.235 \\ -0.055 \\ 0.04 \\ 0 \end{pmatrix} \begin{pmatrix} 0.23 \\ -0.033 \\ -0.025 \\ 0 \end{pmatrix} \begin{pmatrix} -0.198 \\ 0.033 \\ 0.082 \\ 0 \end{pmatrix} \begin{pmatrix} 0.113 \\ -0.028 \\ -0.025 \\ 0 \end{pmatrix} \begin{pmatrix} -0.027 \\ 0.041 \\ -0.022 \\ 0 \end{pmatrix} \end{bmatrix}$$

$$Residual3 = \begin{bmatrix} \begin{pmatrix} -0 \\ 0.011 \\ 0.053 \\ 0 \end{pmatrix} \begin{pmatrix} 0 \\ -0.035 \\ -0.026 \\ 0 \end{pmatrix} \begin{pmatrix} -0 \\ 0.024 \\ -0.027 \\ 0 \end{pmatrix} \\ \begin{pmatrix} 0 \\ -0.032 \\ -0.01 \\ 0 \end{pmatrix} \begin{pmatrix} -0 \\ 0.014 \\ -0.012 \\ 0 \end{pmatrix} \begin{pmatrix} -0 \\ 0.018 \\ 0.023 \\ 0 \end{pmatrix} \\ \begin{pmatrix} -0 \\ -0.005 \\ -0.01 \\ 0 \end{pmatrix} \begin{pmatrix} 0 \\ -0.009 \\ 0.039 \\ 0 \end{pmatrix} \begin{pmatrix} -0 \\ 0.014 \\ -0.028 \\ 0 \end{pmatrix} \\ \begin{pmatrix} 0 \\ -0.004 \\ -0.009 \\ 0 \end{pmatrix} \begin{pmatrix} 0 \\ -0.006 \\ 0.028 \\ 0 \end{pmatrix} \begin{pmatrix} -0 \\ 0.01 \\ -0.02 \\ 0 \end{pmatrix} \end{bmatrix}$$

We now have to find out which LaserTracker target nests where used by the user for each of the 4 cycles. As a first step, we create a Matrix with the possible distances of all LaserTracker targets relative to each other for all four cycles, using the Sensor Space as the known stationary coordinate space:

$$p := 0..M-1$$

$$Dis_{m \cdot K+k, p \cdot K+j} := |TtoS3_m \cdot LTCenterTS_k - TtoS3_p \cdot LTCenterTS|$$

Dis =

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 0 | 9.6 | 7.4 | 4.5 | 66 | 6.4 | 0.3 | 0.3 | 0.3 | 9.8 | 7.4 | 4.3 | 5.9 | 6.4 | 0.5 | 0.5 | 0.2 | 9.6 | 7.4 | 4.5 | 6.1 | 6.4 | 0.4 | 0.5 | 0.2 | 9.6 | 7.4 | 4.5 | 6.1 | 6.4 | 0.4 | 0.4 |
| 1 | 9.6 | 0 | 68 | 5.3 | 9.6 | 2.6 | 0.2 | 0.4 | 9.5 | 0.5 | 8.3 | 5.4 | 9.5 | 2.7 | 9.8 | 0.1 | 9.6 | 0.5 | 7.8 | 5.2 | 9.6 | 2.6 | 0.7 | 0.7 | 9.7 | 0.4 | 7.8 | 5.2 | 9.6 | 2.6 | 0.6 | 0.6 |
| 2 | 7.4 | 68 | 0 | 1.5 | 3.9 | 0.3 | 4.4 | 6.8 | 7.4 | 7.7 | 0.4 | 1.8 | 4.1 | 0.2 | 4.2 | 6.7 | 7.4 | 8.2 | 0.4 | 1.3 | 3.6 | 30 | 4.5 | 6.7 | 7.4 | 8.2 | 0.3 | 1.4 | 3.7 | 0.1 | 4.5 | 6.7 |
| 3 | 4.5 | 5.3 | 1.5 | 0 | 0.2 | 3.4 | 6.4 | 9.1 | 4.6 | 5.2 | 1.2 | 0.4 | 0.6 | 3.3 | 6.5 | 9.3 | 4.5 | 5.4 | 1.7 | 0.5 | 9.8 | 3.2 | 6.4 | 8.9 | 4.5 | 5.4 | 1.6 | 0.4 | 9.9 | 3.3 | 6.4 | 8.9 |
| 4 | 66 | 9.6 | 3.9 | 0.2 | 0 | 9.6 | 0.1 | 7.6 | 6.1 | 9.6 | 3.7 | 9.9 | 0.4 | 9.6 | 0.3 | 7.9 | 5.9 | 9.6 | 4.2 | 0.7 | 0.5 | 9.7 | 9.9 | 7.4 | 5.9 | 9.5 | 4.1 | 0.6 | 0.4 | 9.6 | 80 | 7.4 |
| 5 | 6.4 | 2.6 | 0.3 | 3.4 | 9.6 | 0 | 66 | 5.7 | 6.4 | 2.5 | 0.4 | 3.5 | 9.6 | 0.1 | 5.9 | 5.6 | 6.4 | 2.6 | 0.6 | 3.5 | 9.5 | 0.3 | 5.8 | 5.5 | 6.4 | 2.6 | 0.5 | 3.4 | 9.5 | 0.2 | 5.9 | 5.6 |
| 6 | 0.3 | 0.2 | 4.4 | 6.4 | 0.1 | 66 | 0 | 5.8 | 0.1 | 0.6 | 4.7 | 6.4 | 9.9 | 6.1 | 0.5 | 5.4 | 0.2 | 9.8 | 4.4 | 6.5 | 0.3 | 6.2 | 0.5 | 46 | 0.2 | 9.8 | 4.3 | 6.4 | 0.3 | 6.1 | 0.4 | 46 |
| 7 | 0.3 | 0.4 | 6.8 | 9.1 | 7.6 | 5.7 | 5.8 | 0 | 0.1 | 0.7 | 6.8 | 8.7 | 7.4 | 5.8 | 6.2 | 0.5 | 30 | 0.2 | 6.8 | 9.2 | 7.9 | 5.9 | 5.7 | 0.4 | 0.1 | 0.2 | 6.8 | 9.2 | 7.9 | 5.8 | 5.7 | 0.3 |
| 8 | 0.3 | 9.5 | 7.4 | 4.6 | 6.1 | 6.4 | 0.1 | 0.1 | 0 | 9.6 | 7.4 | 4.5 | 66 | 6.4 | 0.3 | 0.3 | 0.2 | 9.5 | 7.4 | 4.6 | 6.1 | 6.4 | 0.2 | 0.3 | 0.2 | 9.4 | 7.4 | 4.6 | 6.1 | 6.4 | 0.1 | 0.2 |
| 9 | 9.8 | 0.5 | 7.7 | 5.2 | 9.6 | 2.5 | 0.6 | 0.7 | 9.6 | 0 | 68 | 5.3 | 9.6 | 2.6 | 0.2 | 0.4 | 9.8 | 1 | 7.5 | 5.1 | 9.7 | 2.5 | 1.1 | 61 | 9.8 | 0.9 | 7.6 | 5.1 | 9.7 | 2.5 | 31 | 0.9 |
| 10 | 7.4 | 8.3 | 0.4 | 1.2 | 3.7 | 0.4 | 4.7 | 6.8 | 7.4 | 68 | 0 | 1.5 | 3.9 | 0.3 | 4.4 | 6.8 | 7.4 | 8.4 | 0.7 | 51 | 3.4 | 30 | 4.7 | 6.7 | 7.4 | 8.4 | 0.6 | 51 | 3.5 | 0.2 | 4.7 | 6.8 |
| 11 | 4.3 | 5.4 | 1.8 | 0.4 | 9.9 | 3.5 | 6.4 | 8.8 | 4.5 | 5.3 | 1.5 | 0 | 0.2 | 3.4 | 6.4 | 9.1 | 4.4 | 5.5 | 52 | 0.9 | 9.4 | 3.3 | 6.3 | 8.7 | 4.4 | 5.5 | 52 | 0.8 | 9.5 | 3.4 | 6.4 | 8.7 |
| 12 | 5.9 | 9.5 | 4.1 | 0.6 | 0.4 | 9.6 | 9.9 | 7.4 | 66 | 9.6 | 3.9 | 0.2 | 0 | 9.6 | 0.1 | 7.6 | 5.9 | 9.5 | 4.3 | 1.1 | 0.9 | 9.7 | 9.7 | 7.1 | 5.8 | 9.5 | 4.3 | 31 | 0.8 | 9.7 | 9.8 | 7.2 |
| 13 | 6.4 | 2.7 | 0.2 | 3.3 | 9.6 | 0.1 | 6.1 | 5.8 | 6.4 | 2.6 | 0.3 | 3.4 | 9.6 | 0 | 66 | 5.7 | 6.4 | 2.6 | 0.5 | 3.4 | 9.5 | 0.3 | 5.9 | 5.6 | 6.4 | 2.6 | 0.4 | 3.4 | 9.5 | 0.1 | 66 | 5.6 |
| 14 | 0.5 | 9.8 | 4.2 | 6.5 | 0.3 | 5.9 | 0.5 | 6.2 | 0.3 | 0.2 | 4.4 | 6.4 | 0.1 | 66 | 0 | 5.8 | 0.4 | 9.4 | 4.1 | 6.5 | 0.5 | 66 | 0.9 | 6.4 | 0.5 | 9.4 | 4.1 | 6.5 | 0.5 | 66 | 0.9 | 6.4 |
| 15 | 0.5 | 0.1 | 6.7 | 9.3 | 7.9 | 5.6 | 5.4 | 0.5 | 0.3 | 0.4 | 6.8 | 9.1 | 7.6 | 5.7 | 5.8 | 0 | 0.2 | 9.9 | 6.8 | 9.5 | 8.2 | 5.8 | 5.3 | 0.7 | 0.3 | 9.9 | 6.7 | 9.4 | 8.1 | 5.8 | 5.3 | 0.7 |
| 16 | 0.2 | 9.6 | 7.4 | 4.5 | 5.9 | 6.4 | 0.2 | 30 | 0.2 | 9.8 | 7.4 | 4.4 | 5.9 | 6.4 | 0.4 | 0.2 | 0 | 9.6 | 7.4 | 4.5 | 66 | 6.4 | 0.3 | 0.3 | 0.1 | 9.6 | 7.4 | 4.5 | 66 | 6.4 | 0.3 | 0.2 |
| 17 | 9.6 | 0.5 | 8.2 | 5.4 | 9.6 | 2.6 | 9.8 | 0.2 | 9.5 | 1 | 8.4 | 5.5 | 9.5 | 2.6 | 9.4 | 9.9 | 9.6 | 0 | 68 | 5.3 | 9.6 | 2.6 | 0.2 | 0.4 | 9.7 | 0.1 | 68 | 5.3 | 9.6 | 2.6 | 0.2 | 0.4 |
| 18 | 7.4 | 7.8 | 0.4 | 1.7 | 4.2 | 0.6 | 4.4 | 6.8 | 7.4 | 7.5 | 0.7 | 52 | 4.3 | 0.5 | 4.1 | 6.8 | 7.4 | 68 | 0 | 1.5 | 3.9 | 0.3 | 4.4 | 6.8 | 7.4 | 68 | 0.1 | 1.5 | 3.9 | 0.4 | 4.4 | 6.8 |
| 19 | 4.5 | 5.2 | 1.3 | 0.5 | 0.7 | 3.5 | 6.5 | 9.2 | 4.6 | 5.1 | 51 | 0.9 | 1.1 | 3.4 | 6.5 | 9.5 | 4.5 | 5.3 | 1.5 | 0 | 0.2 | 3.4 | 6.4 | 9.1 | 4.5 | 5.3 | 1.5 | 0.1 | 0.4 | 3.4 | 6.4 | 9.1 |
| 20 | 6.1 | 9.6 | 3.6 | 9.8 | 0.5 | 9.5 | 0.3 | 7.9 | 6.1 | 9.7 | 3.4 | 9.4 | 0.9 | 9.5 | 0.5 | 8.2 | 66 | 9.6 | 3.9 | 0.2 | 0 | 9.6 | 0.1 | 7.6 | 66 | 9.6 | 3.8 | 0.1 | 0.1 | 9.6 | 0.2 | 7.7 |
| 21 | 6.4 | 2.6 | 30 | 3.2 | 9.7 | 0.3 | 6.2 | 5.9 | 6.4 | 2.5 | 30 | 3.3 | 9.7 | 0.3 | 66 | 5.8 | 6.4 | 2.6 | 0.3 | 3.4 | 9.6 | 0 | 66 | 5.7 | 6.4 | 2.6 | 0.2 | 3.3 | 9.6 | 0.1 | 6.1 | 5.7 |
| 22 | 0.4 | 0.7 | 4.5 | 6.4 | 9.9 | 5.8 | 0.5 | 5.7 | 0.2 | 1.1 | 4.7 | 6.3 | 9.7 | 5.9 | 0.9 | 5.3 | 0.3 | 0.2 | 4.4 | 6.4 | 0.1 | 66 | 0 | 5.8 | 0.3 | 0.3 | 4.4 | 6.4 | 0.1 | 5.9 | 0.1 | 5.8 |
| 23 | 0.5 | 0.7 | 6.7 | 8.9 | 7.4 | 5.5 | 46 | 0.4 | 0.3 | 61 | 6.7 | 8.7 | 7.1 | 5.6 | 6.4 | 0.7 | 0.3 | 0.4 | 6.8 | 9.1 | 7.6 | 5.7 | 5.8 | 0 | 0.3 | 0.4 | 6.7 | 69 | 7.6 | 5.7 | 5.8 | 0.1 |
| 24 | 0.2 | 9.7 | 7.4 | 4.5 | 5.9 | 6.4 | 0.2 | 0.1 | 0.2 | 9.8 | 7.4 | 4.4 | 5.8 | 6.4 | 0.5 | 0.3 | 0.1 | 9.7 | 7.4 | 4.5 | 66 | 6.4 | 0.3 | 0.3 | 0 | 9.6 | 7.4 | 4.5 | 66 | 6.4 | 0.3 | 0.3 |
| 25 | 9.6 | 0.4 | 8.2 | 5.4 | 9.5 | 2.6 | 9.8 | 0.2 | 9.4 | 0.9 | 8.4 | 5.5 | 9.5 | 2.6 | 9.4 | 9.9 | 9.6 | 0.1 | 68 | 5.3 | 9.6 | 2.6 | 0.3 | 0.4 | 9.6 | 0 | 68 | 5.3 | 9.6 | 2.6 | 0.2 | 0.4 |
| 26 | 7.4 | 7.8 | 0.3 | 1.6 | 4.1 | 0.5 | 4.3 | 6.8 | 7.4 | 7.6 | 0.6 | 52 | 4.3 | 0.4 | 4.1 | 6.7 | 7.4 | 68 | 0.1 | 1.5 | 3.8 | 0.2 | 4.4 | 6.7 | 7.4 | 68 | 0 | 1.5 | 3.9 | 0.3 | 4.4 | 6.8 |
| 27 | 4.5 | 5.2 | 1.4 | 0.4 | 0.6 | 3.4 | 6.4 | 9.2 | 4.6 | 5.1 | 51 | 0.8 | 31 | 3.4 | 6.5 | 9.4 | 4.5 | 5.3 | 1.5 | 0.1 | 0.1 | 3.3 | 6.4 | 69 | 4.5 | 5.3 | 1.5 | 0 | 0.2 | 3.4 | 6.4 | 9.1 |
| 28 | 6.1 | 9.6 | 3.7 | 9.9 | 0.4 | 9.5 | 0.3 | 7.9 | 6.1 | 9.7 | 3.5 | 9.5 | 0.8 | 9.5 | 0.5 | 8.1 | 66 | 9.6 | 3.9 | 0.4 | 0.1 | 9.6 | 0.1 | 7.6 | 66 | 9.6 | 3.9 | 0.2 | 0 | 9.6 | 0.1 | 7.6 |
| 29 | 6.4 | 2.6 | 0.1 | 3.3 | 9.6 | 0.2 | 6.1 | 5.8 | 6.4 | 2.5 | 0.2 | 3.4 | 9.7 | 0.1 | 66 | 5.8 | 6.4 | 2.6 | 0.4 | 3.4 | 9.6 | 0.1 | 5.9 | 5.7 | 6.4 | 2.6 | 0.3 | 3.4 | 9.6 | 0 | 66 | 5.7 |
| 30 | 0.4 | 0.6 | 4.5 | 6.4 | 80 | 5.9 | 0.4 | 5.7 | 0.1 | 31 | 4.7 | 6.4 | 9.8 | 66 | 0.9 | 5.3 | 0.3 | 0.2 | 4.4 | 6.4 | 0.2 | 6.1 | 0.1 | 5.8 | 0.3 | 0.2 | 4.4 | 6.4 | 0.1 | 66 | 0 | 5.8 |
| 31 | 0.4 | 0.6 | 6.7 | 8.9 | 7.4 | 5.6 | 46 | 0.3 | 0.2 | 0.9 | 6.8 | 8.7 | 7.2 | 5.6 | 6.4 | 0.7 | 0.2 | 0.4 | 6.8 | 9.1 | 7.7 | 5.7 | 5.8 | 0.1 | 0.3 | 0.4 | 6.8 | 9.1 | 7.6 | 5.7 | 5.8 | 0 |

From the LaserTracker, we get four measurement Results, one for each cycle. We do not know yet, which nests were used:

LTCentersPS :=

| Centers of LT Targets measured in Part Space | | | |
|---|---|---|---|
| 1111.813 | -668.54 | -305.694 | 1 |
| 1123.09 | -712.876 | -281.476 | 1 |
| 1145.349 | -744.508 | -332.822 | 1 |
| 1134.258 | -695.139 | -364.314 | 1 |

$LTCentersPS := LTCentersPS^T \quad LTCenterPS_m := LTCentersPS^{\langle m \rangle}$ $$LTCenterPS^T = \left[ \begin{pmatrix} 1111.813 \\ -668.54 \\ -305.694 \\ 1 \end{pmatrix} \begin{pmatrix} 1123.09 \\ -712.876 \\ -281.476 \\ 1 \end{pmatrix} \begin{pmatrix} 1145.349 \\ -744.508 \\ -332.822 \\ 1 \end{pmatrix} \begin{pmatrix} 1134.258 \\ -695.139 \\ -364.314 \\ 1 \end{pmatrix} \right]$$

We compute a table with the relative distances between any two points measured by the LaserTracker:

$LTDistPS_{m,p} := |LTCenterPS_m - LTCenterPS_p|$ $$LTDistPS = \begin{pmatrix} 0 & 51.763 & 87.36 & 68.173 \\ 51.763 & 0 & 64.284 & 85.449 \\ 87.36 & 64.284 & 0 & 59.599 \\ 68.173 & 85.449 & 59.599 & 0 \end{pmatrix}$$

We create a table with information where the measured distances from the LaserTracker match the predicted values based on the possible positions of the LaserTracker Target in every nest:

$Hits_{m \cdot K+k, p \cdot K+j} := if(|Dist_{m \cdot K+k, p \cdot K+j} - LTDistPS_{m,p}| < 0.25, 1, 0)$ Any hits on the diagonal sub-matrices must be coincidents and can be ignored:

$Hits_{m \cdot K+k, m \cdot K+j} := 0$

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  | 0 | 0 | 0 | 0 | 0 | 0 | 0 | 0 | 0 | 0 | 0  | 0  | 0  | 0  | 0  | 0  | 0  | 0  | 1  | 0  | 0  | 0  | 0  | 0  | 0  | 0  | 0  | 0  | 0  | 0  | 0  | 0  |
| 1  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 2  | 0 | 0 | 0 | 0 | 0 | 0 | 0 | 0 | 0 | 0 | 0  | 0  | 1  | 0  | 0  | 0  | 0  | 1  | 0  | 0  | 0  | 0  | 0  | 0  | 1  | 0  | 0  | 0  | 0  | 0  | 0  | 0  |
| 3  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 4  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 5  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 6  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 7  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 8  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 9  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 10 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 11 | 0 | 0 | 1 | 0 | 0 | 0 | 0 | 0 | 0 | 0 | 0  | 0  | 0  | 0  | 0  | 0  | 1  | 0  | 0  | 0  | 0  | 0  | 0  | 0  | 1  | 0  | 0  | 0  | 0  | 0  | 0  | 0  |
| 12 | 0 | 0 | 0 | 0 | 0 | 0 | 0 | 0 | 0 | 0 | 0  | 0  | 0  | 0  | 0  | 0  | 0  | 1  | 0  | 0  | 0  | 0  | 0  | 0  | 0  | 0  | 0  | 0  | 0  | 0  | 0  | 0  |
| 13 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 14 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 15 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 16 | 0 | 0 | 1 | 0 | 0 | 0 | 0 | 0 | 0 | 0 | 0  | 1  | 0  | 0  | 0  | 0  | 0  | 0  | 0  | 0  | 0  | 0  | 0  | 1  | 0  | 0  | 0  | 0  | 0  | 0  | 0  | 0  |
| 17 | 0 | 0 | 0 | 0 | 0 | 0 | 0 | 0 | 0 | 0 | 0  | 0  | 0  | 0  | 0  | 0  | 0  | 0  | 0  | 0  | 0  | 1  | 0  | 0  | 0  | 0  | 0  | 0  | 0  | 0  | 0  | 0  |
| 18 | 1 | 0 | 0 | 0 | 0 | 0 | 0 | 0 | 0 | 0 | 0  | 0  | 1  | 0  | 0  | 0  | 0  | 0  | 0  | 0  | 0  | 0  | 0  | 0  | 0  | 0  | 0  | 0  | 0  | 0  | 0  | 0  |
| 19 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 20 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 21 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 22 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 23 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 24 | 0 | 0 | 0 | 0 | 0 | 0 | 0 | 0 | 0 | 0 | 0  | 0  | 0  | 0  | 0  | 0  | 1  | 0  | 0  | 0  | 0  | 0  | 0  | 0  | 0  | 0  | 0  | 0  | 0  | 0  | 0  | 0  |
| 25 | 0 | 0 | 1 | 0 | 0 | 0 | 0 | 0 | 0 | 0 | 0  | 1  | 0  | 0  | 0  | 0  | 1  | 0  | 0  | 0  | 0  | 0  | 0  | 0  | 0  | 0  | 0  | 0  | 0  | 0  | 0  | 0  |
| 26 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 27 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 28 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 29 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 30 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 31 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |

$$\text{InitialHitCount}_{j,p} := \sum_m \max[\text{submatrix}(\text{Hits}, m \cdot K, (m+1) \cdot K - 1, p \cdot K + j, p \cdot K + j)]$$

$$\text{InitialHitCount} = \begin{pmatrix} 1 & 0 & 3 & 1 \\ 0 & 0 & 1 & 3 \\ 3 & 0 & 2 & 0 \\ 0 & 3 & 0 & 0 \\ 0 & 1 & 0 & 0 \\ 0 & 0 & 0 & 0 \\ 0 & 0 & 0 & 0 \\ 0 & 0 & 0 & 0 \end{pmatrix}$$

$$\text{InitialStrayHits} = \sum_j \sum_p \text{InitialHitCount}_{j,p} - M \cdot (M-1)$$

$$\text{InitialStrayHits} = 6$$

Hits =

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|----|---|---|---|---|---|---|---|---|---|---|----|----|----|----|----|----|----|----|----|----|----|----|----|----|----|----|----|----|----|----|----|----|
| 0  | 0 | 0 | 0 | 0 | 0 | 0 | 0 | 0 | 0 | 0 | 0  | 0  | 0  | 0  | 0  | 0  | 0  | 0  | 0  | 1  | 0  | 0  | 0  | 0  | 0  | 0  | 0  | 0  | 0  | 0  | 0  | 0  |
| 1  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 2  | 0 | 0 | 0 | 0 | 0 | 0 | 0 | 0 | 0 | 0 | 0  | 0  | 1  | 0  | 0  | 0  | 1  | 0  | 0  | 0  | 0  | 0  | 0  | 0  | 1  | 0  | 0  | 0  | 0  | 0  | 0  | 0  |
| 3  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 4  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 5  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 6  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 7  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 8  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 9  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 10 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 11 | 0 | 0 | 1 | 0 | 0 | 0 | 0 | 0 | 0 | 0 | 0  | 0  | 0  | 0  | 0  | 1  | 0  | 0  | 0  | 0  | 0  | 0  | 0  | 1  | 0  | 0  | 0  | 0  | 0  | 0  | 0  | 0  |
| 12 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 13 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 14 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 15 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 16 | 0 | 0 | 1 | 0 | 0 | 0 | 0 | 0 | 0 | 0 | 0  | 1  | 0  | 0  | 0  | 0  | 0  | 0  | 0  | 0  | 0  | 0  | 0  | 0  | 1  | 0  | 0  | 0  | 0  | 0  | 0  | 0  |
| 17 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 1  | 0  | 0  | 0  | 0  | 0  | 0  | 0  | 0  | 0  |
| 18 | 1 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 19 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 20 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 21 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 22 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 23 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 24 | 0 | 0 | 0 | 0 | 0 | 0 | 0 | 0 | 0 | 0 | 0  | 0  | 0  | 0  | 0  | 0  | 1  | 0  | 0  | 0  | 0  | 0  | 0  | 0  | 0  | 0  | 0  | 0  | 0  | 0  | 0  | 0  |
| 25 | 0 | 0 | 1 | 0 | 0 | 0 | 0 | 0 | 0 | 0 | 0  | 1  | 0  | 0  | 0  | 1  | 0  | 0  | 0  | 0  | 0  | 0  | 0  | 0  | 0  | 0  | 0  | 0  | 0  | 0  | 0  | 0  |
| 26 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 27 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 28 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 29 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 30 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |
| 31 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  | 0  | 0  | 0  | 0  | 0  | 0  | 0  |

$$\text{HitCount}_{j,p} := \sum_{m} \max[\text{submatrix}[\text{Hits}, m \cdot K, (m+1) \cdot K - 1, p \cdot K + j, p \cdot K + j]]$$

$$\text{StrayHits} := \sum_{j} \sum_{p} \text{HitCount}_{j,p} - M \cdot (M-1)$$

StrayHits = 4

$$\text{HitCount} = \begin{pmatrix} 1 & 0 & 3 & 1 \\ 0 & 0 & 1 & 3 \\ 3 & 0 & 1 & 0 \\ 0 & 3 & 0 & 0 \\ 0 & 0 & 0 & 0 \\ 0 & 0 & 0 & 0 \\ 0 & 0 & 0 & 0 \\ 0 & 0 & 0 & 0 \end{pmatrix}$$

$$\text{NumFound} := \sum_j \sum_p \text{if}(\text{HitCount}_{j,p} = M - 1, 1, 0)$$

$$\text{NumFound} = 4$$

At this point, we can check if we had any nests that have been (accidentely) used multiple times:

$$\text{DuplicateLTNest}_{m,p} := \text{if}\left(\sum_k \text{Hits}_{m \cdot K+k, p \cdot K+k} > 0, 1, 0\right)$$

$$\text{DuplicateLTNest}_{m,m} := 1$$

$$\text{DuplicateLTNests} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \quad \text{(Must be Identity Matrix)} \quad \text{rank}(\text{DuplicateLTNest}) = 4$$

Result := "Nests Successfully Identified"

Result := if(rank(DuplicateLTNest) = M − 1, "Duplicate Nests Used, Result still possible", Result)

Result := if(NumFound ≠ M, "Could Not Identify Nests Used", Result)

Result := if(rank(DuplicateLTNest) ≤ M − 2, "Duplicate Nests Used, NO Result possible", Result)

Result = "Nests Successfully Identified"

$$\text{LTNestsUsed}_m := \sum_k \text{if}(\text{HitCount}_{k,m} \geq M - 1, k + 1, 0)$$

$$\text{LTNestsUsed} = \begin{pmatrix} 3 \\ 4 \\ 1 \\ 2 \end{pmatrix}$$

Now that we know which nests were used to hold the target, we can compute the Sensor-To-Part transform. As a first step, we compu the Centers of the LTTargets in the identified nests in Sensor Space for each cycle:

$$\text{LTCenterSS}_m := \text{TtoS}_m \cdot \text{LTCenterTS}_{(\text{LTNestsUsed}_m)-1}$$

$$\text{LTCenterSS}^T = \left[ \begin{pmatrix} 10.791 \\ -29.524 \\ -21.414 \\ 1 \end{pmatrix} \begin{pmatrix} 10.263 \\ -30.641 \\ 30.38 \\ 1 \end{pmatrix} \begin{pmatrix} 11.141 \\ 33.066 \\ 39.629 \\ 1 \end{pmatrix} \begin{pmatrix} 11.317 \\ 38.634 \\ -19.729 \\ 1 \end{pmatrix} \right]$$

We try to minimize the sum of the distance between the Points as measured in the Part Space and the Points known in Sensor Space with the (yet unknown) Sensor-to-Part transform applied to them:

$$\text{RMS}(Tx, Ty, Tz, Rz, Ry, Rx) := \sqrt{\frac{\sum_m \left(\left|\text{LTCenterPS}_m - \text{SensorToPart}(Tx, Ty, Tz, Rz, Ry, Rx) \cdot \text{LTCenterSS}_m\right|\right)^2}{M}}$$

As start values, we chose all Translations and Rotations to be 0. If guesses are available, they can be entered here, but are not necessary:

$Tx := 0 \quad Ty := 0 \quad Tz := 0 \quad Rz := 0 \cdot \text{deg} \quad Ry := 0 \cdot \text{deg} \quad Rx := 0 \cdot \text{deg}$ The RMS Error will be pretty big before the optimization:

RMS(Tx,Ty,Tz,Rz,Ry,Rx) = 1364.772

Given $LTCenterPS_0 = SensorToPart(Tx,Ty,Tz,Rz,Ry,Rx) \cdot LTCenterSS_0$ $LTCenterPS_1 = SensorToPart(Tx,Ty,Tz,Rz,Ry,Rx) \cdot LTCenterSS_1$ $LTCenterPS_2 = SensorToPart(Tx,Ty,Tz,Rz,Ry,Rx) \cdot LTCenterSS_2$ $LTCenterPS_3 = SensorToPart(Tx,Ty,Tz,Rz,Ry,Rx) \cdot LTCenterSS_3$ Result := Minerr(Tx,Ty,Tz,Rz,Ry,Rx)

We can extract the individual Translations and Rotations from the result vector:

Tx := Result   Ty := Result   Tz := Result   Rz := Result   Ry := Result   Rx := Result Let's show the results:

Tx = 1136.11      Ty = −694.295      Tz = −319.534

Rz = −159.926deg   Ry = 12.031deg    Rx = −62.748deg

This is the RMS error after the optimization. The value should be smaller than 0.1:

RMS(Tx,Ty,Tz,Rz,Ry,Rx) = 0.039

$ResidualSToP_m := LTCenterPS_m - SensorToPart(Tx,Ty,Tz,Rz,Ry,Rx) \cdot LTCenterSS_m$ Let's calculate the Sensor-to-Part transform:

StoP := SensorToPart(Tx,Ty,Tz,Rz,Ry,Rx)

$$StoP = \begin{pmatrix} -0.919 & 0.331 & 0.215 & 1136.11 \\ -0.336 & -0.366 & -0.868 & -694.295 \\ -0.208 & -0.869 & 0.448 & -319.534 \\ 0 & 0 & 0 & 1 \end{pmatrix}$$

$$ResidualSToP = \begin{bmatrix} \begin{pmatrix} 0.009 \\ -0.024 \\ 0.009 \\ 0 \end{pmatrix} \\ \begin{pmatrix} 0.01 \\ -0.003 \\ -0.05 \\ 0 \end{pmatrix} \\ \begin{pmatrix} -0.018 \\ 0.034 \\ 0.036 \\ 0 \end{pmatrix} \\ \begin{pmatrix} -0.001 \\ -0.006 \\ 0.005 \\ 0 \end{pmatrix} \end{bmatrix}$$

$$|ResidualSToP_m| = \begin{pmatrix} 0.028 \\ 0.051 \\ 0.052 \\ 0.008 \end{pmatrix}$$

Some Definitions we have used:

$$RotX(Rx) \equiv \begin{pmatrix} 1 & 0 & 0 & 0 \\ 0 & \cos(Rx) & -\sin(Rx) & 0 \\ 0 & \sin(Rx) & \cos(Rx) & 0 \\ 0 & 0 & 0 & 1 \end{pmatrix} \quad RotY(Ry) \equiv \begin{pmatrix} \cos(Ry) & 0 & \sin(Ry) & 0 \\ 0 & 1 & 0 & 0 \\ -\sin(Ry) & 0 & \cos(Ry) & 0 \\ 0 & 0 & 0 & 1 \end{pmatrix} \quad Origin \equiv \begin{pmatrix} 0 \\ 0 \\ 0 \\ 1 \end{pmatrix}$$

$$RotZ(Rz) \equiv \begin{pmatrix} \cos(Rz) & -\sin(Rz) & 0 & 0 \\ \sin(Rz) & \cos(Rz) & 0 & 0 \\ 0 & 0 & 1 & 0 \\ 0 & 0 & 0 & 1 \end{pmatrix} \quad Trans(Tx, Ty, Tz) \equiv \begin{pmatrix} 1 & 0 & 0 & Tx \\ 0 & 1 & 0 & Ty \\ 0 & 0 & 1 & Tz \\ 0 & 0 & 0 & 1 \end{pmatrix}$$

What is claimed is:

1. A target assembly for use in calibrating a non-contact sensor in a sensor calibration system, comprising:
   a rigid support structure;
   a first pair of truncated cones mounted adjacent to each other on a surface of the support structure, where one of the truncated cones is orientated inversely in relation to the other truncated cone; and
   at least three targets connected to the support structure for calibrating the target assembly in relation to a reference frame external to the target assembly, each of the targets positioned spatially apart from each other and from the first pair of truncated cones.

2. The target assembly of claim 1 further comprises a second pair of truncated cones and a third pair of truncated cones mounted on the first surface of the support structure, the second and third pairs of truncated cones positioned spatially apart from each other and from the first pair of truncated cones.

3. The target assembly of claim 1 wherein each of the truncated cones having a conical angle of substantially 25 degrees.

4. The target assembly of claim 1 wherein the at least three targets are further defined as four nesting stations mounted onto the surface of the support structure, each nesting station adapted to receive a retroreflector associated with a laser tracker and positioned spatially apart from each of the other nesting stations and the pair of truncated cones.

5. The target assembly of claim 4 further comprises four additional nesting stations mounted onto an opposing surface of the support structure and positioned spatially apart from each other.

6. The target assembly of claim 5 wherein each of the nest stations are spaced a different distance from each other.

7. A method for calibrating a non-contact sensor with respect to an external reference frame, comprising:
   positioning a target assembly coincidentally within a sensing zone of the non-contact sensor and within a field of observation of a target calibration device, the target assembly having at least three targets measurable by the target calibration device;
   capturing positional data for the three targets in discrete measurement steps taken by the target calibration device, wherein the positional data is defined in the external reference frame;
   capturing images of the target assembly with the non-contact sensor during each discrete measurement step taken by the target calibration device;
   determining positional data for the three targets based in part on the image data, wherein the positional data is defined in the sensor reference frame;
   determining an order in which the three targets were measured by the target calibration device;
   determining a transform between the sensor reference frame and the external reference frame using the positional data for the three targets defined in the sensor reference frame and the positional data for the three targets as captured by the target calibration device, whereby the non-contact sensor is calibrated with respect to the external reference frame.

8. The method of claim 7 wherein the target calibration device is further defined as a laser tracker and the three targets on the target assembly are further defined as nesting stations adapted to receive a retroreflector associated with the laser tracker.

9. The method of claim 8 wherein capturing positional data for each of the three targets occurs as the retroreflector is moved amongst the three nesting stations of the target assembly.

10. The method of claim 8 wherein capturing positional data for each of the three targets includes placing a retroreflector concurrently on the three nesting stations of the target assembly.

11. The method of claim 9 wherein determining positional data for the three targets further comprises:
   determining a transform between a sensor reference frame associated with the non-contact sensor and a target reference frame associated with the target assembly for each measurement step based in part on the image data; and
   converting positional data for the nesting stations defined in the target reference frame to positional data for the nesting stations defined in the sensor reference frame using the transform.

12. The method of claim 7 wherein determining positional data for the three targets is further based on known dimensional data for the three targets.

13. A method for calibrating a non-contact sensor with respect to an external reference frame, comprising:
   positioning a target assembly coincidentally within a sensing zone of the non-contact sensor and within a field of observation of a laser tracker, the target assembly having at least four nesting stations adapted to receive a retroreflector associated with a laser tracker;
   capturing positional data for one of the nesting stations with the laser tracker as a retroreflector is moved amongst four of the nesting stations of the target assembly, wherein the positional data is defined in the external reference frame;
   capturing images of the target assembly with the non-contact sensor when the retroreflector is placed in each of the four nesting stations;
   determining positional data for the nesting stations defined in the sensor reference frame based in part on the image data;
   determining an order in which the reflector was placed on each of the four nesting stations;
   determining a transform between the sensor reference frame and the external reference frame using the positional data for the nesting stations defined in the sensor reference frame and the positional data for the nesting stations as captured by the laser tracker, whereby the non-contact sensor is calibrated with respect to the external reference frame.

14. The method of claim 13 wherein determining positional data for the nesting stations defined in the sensor reference frame further comprises:
   determining a transform for each measurement cycle between a sensor reference frame associated with the non-contact sensor and a target reference frame associated with the target assembly based in part on the image data; and
   converting positional data for the nesting stations defined in the target reference frame to positional data for the nesting stations defined in the sensor reference frame using the transform.

15. The method of claim 14 wherein the target assembly further comprises a plate member having at least three non-coplanar sensor target surfaces spatially separated from the four nesting stations.

16. The method of claim 15 wherein the three non-coplanar reflective sensor target surfaces are further defined as three pairs of truncated cones mounted on a surface of the plate member, where one of the truncated cones in each pair is orientated inversely in relation to the other truncated cone in the pair.

17. The method of claim 16 wherein determining a transform between a sensor reference frame and a target reference frame further comprises:
  determining an axial center for each of the truncated cones in the sensor reference frame using the image data;
  determining an axial center for each of the truncated cones in the target reference frame; and
  computing the transform from the axial center data in the sensor reference frame and the axial center data from the target reference frame using a least squares optimization technique.

18. The method of claim 17 wherein the step of determining an axial center for each of the truncated cones in the target reference frame is based on a measured diameter of the truncated cones and known dimensional data for the truncated cones.

19. The method of claim 14 wherein determining an order further comprises:
  defining the positional data for the nesting stations relative to each of the other nesting stations in the target reference frame;
  applying the transform for each measurement cycle to the relative positional data for the nesting stations in the target reference frame, thereby iterating possible relative distance measures between nesting stations in each measurement step as defined in the sensor reference frame;
  defining the measured positional data for the nesting stations relative to each of the other nesting stations in the external reference frame; and
  locating matches for the relative measured positional data amongst the possible relative distance measures defined in the sensor reference frame, thereby determining an order the retroreflector was moved amongst the four nesting stations of the target assembly.

20. A target assembly for use in calibrating a non-contact sensor in a sensor calibration system, comprising:
  a rigid support structure;
  a first pair of sensor targets mounted adjacent to each other on a surface of the support structure, where each sensor target having at least one tapered measurement surface orientated towards the non-contact sensor and being inverted in relation to the tapered measurement surface of the other sensor target; and
  at least three other targets connected to the support structure for calibrating the target assembly in relation to a reference frame external to the target assembly, each of the other targets positioned spatially apart from each other and from the first pair of sensor targets.

* * * * *